US011694557B2

(12) United States Patent
Villa et al.

(10) Patent No.: US 11,694,557 B2
(45) Date of Patent: Jul. 4, 2023

(54) INTEGRATING AIR AND GROUND DATA COLLECTION FOR IMPROVED DRONE OPERATION

(71) Applicant: Joby Aero, Inc., Santa Cruz, CA (US)

(72) Inventors: Ian Andreas Villa, San Francisco, CA (US); Philipp Haban, Pittsburgh, PA (US); Eric Mueller, San Francisco, CA (US); Lucas McPhee Fischer, Belmont, CA (US); Matthew William Derkach, San Francisco, CA (US); John Conway Badalamenti, San Francisco, CA (US)

(73) Assignee: JOBY AERO, INC., Santa Cruz, CA (US)

( * ) Notice: Subject to any disclaimer, the term of this patent is extended or adjusted under 35 U.S.C. 154(b) by 279 days.

(21) Appl. No.: 16/948,394

(22) Filed: Sep. 16, 2020

(65) Prior Publication Data
US 2021/0082291 A1 Mar. 18, 2021

Related U.S. Application Data

(60) Provisional application No. 62/901,156, filed on Sep. 16, 2019.

(51) Int. Cl.
*G08G 5/00* (2006.01)
*H04W 4/00* (2018.01)
(Continued)

(52) U.S. Cl.
CPC ......... *G08G 5/0039* (2013.01); *B64C 39/024* (2013.01); *G06Q 10/02* (2013.01);
(Continued)

(58) Field of Classification Search
CPC .. G08G 5/0039; G08G 5/0013; G08G 5/0026; G08G 5/006; G08G 5/0043; G08G 5/0052; G08G 5/00; B64C 39/024; B64C 2201/123; B64C 2201/127; B64C 2201/12; B64C 2201/141; B64C 2201/146; B64C 39/02; G06Q 10/02; H04W 4/025; H04W 4/46; H04W 4/00
See application file for complete search history.

(56) References Cited

U.S. PATENT DOCUMENTS 7,551,172 B2 * 6/2009 Yaron ................ G06Q 30/0242
715/848
9,646,417 B1 * 5/2017 Sowadski ............ G06T 19/006
(Continued)

OTHER PUBLICATIONS

Uber, "Fast-Forwarding to a Future of On-Demand Urban Air Transportation Introduction", Uber Elevate, (Oct. 27, 2016), 98 pgs.

*Primary Examiner* — Yonel Beaulieu
(74) *Attorney, Agent, or Firm* — Dority & Manning, P.A.

(57) ABSTRACT

Disclosed are embodiments for employing off board sensors to augment data used by a ground based autonomous vehicle. In some aspects, the off-board sensors may be positioned on another autonomous vehicle, such as an aerial autonomous vehicle (AAV). The disclosed embodiments determine uncertainty scores associated with ground regions. The uncertainty scores indicate a need to reimage the ground regions. An AAV may be tasked to reimage a region having a relatively high uncertainty score, depending on a cost associated with the tasking.

20 Claims, 17 Drawing Sheets

(51) Int. Cl.
  *B64C 39/02*   (2023.01)
  *H04W 4/46*    (2018.01)
  *G06Q 10/02*   (2012.01)
  *H04W 4/02*    (2018.01)
  *B64U 101/30*  (2023.01)

(52) U.S. Cl.
  CPC ........... *G08G 5/006* (2013.01); *G08G 5/0013* (2013.01); *G08G 5/0026* (2013.01); *H04W 4/025* (2013.01); *H04W 4/46* (2018.02); *B64U 2101/30* (2023.01)

(56) References Cited

U.S. PATENT DOCUMENTS

| | | | | |
|---|---|---|---|---|
| 10,395,332 B1* | 8/2019 | Konrardy | | G05D 1/0246 |
| 11,267,307 B2* | 3/2022 | Lakehal-Ayat | | B60G 17/016 |
| 11,410,562 B1* | 8/2022 | Mishra | | G08G 5/0069 |
| 2007/0138347 A1* | 6/2007 | Ehlers | | G01C 21/34 |
| | | | | 246/1 R |
| 2009/0092284 A1* | 4/2009 | Breed | | G01S 7/4802 |
| | | | | 382/103 |
| 2013/0015999 A1* | 1/2013 | Alland | | G01S 13/931 |
| | | | | 342/70 |
| 2013/0073775 A1* | 3/2013 | Wade | | H04N 7/181 |
| | | | | 710/316 |
| 2016/0163205 A1* | 6/2016 | Jenkins | | G08G 5/0069 |
| | | | | 701/3 |
| 2016/0275801 A1* | 9/2016 | Kopardekar | | G08G 5/0082 |
| 2017/0073071 A1* | 3/2017 | Salzmann | | G05D 1/0038 |
| 2020/0341117 A1* | 10/2020 | Sandford | | G01S 17/93 |
| 2021/0046943 A1* | 2/2021 | Bybee | | G06V 10/764 |
| 2021/0058555 A1* | 2/2021 | Xu | | G06V 20/58 |
| 2021/0108932 A1* | 4/2021 | Fox | | G06Q 10/06315 |
| 2022/0164557 A1* | 5/2022 | Rossetto | | G06V 10/17 |

* cited by examiner

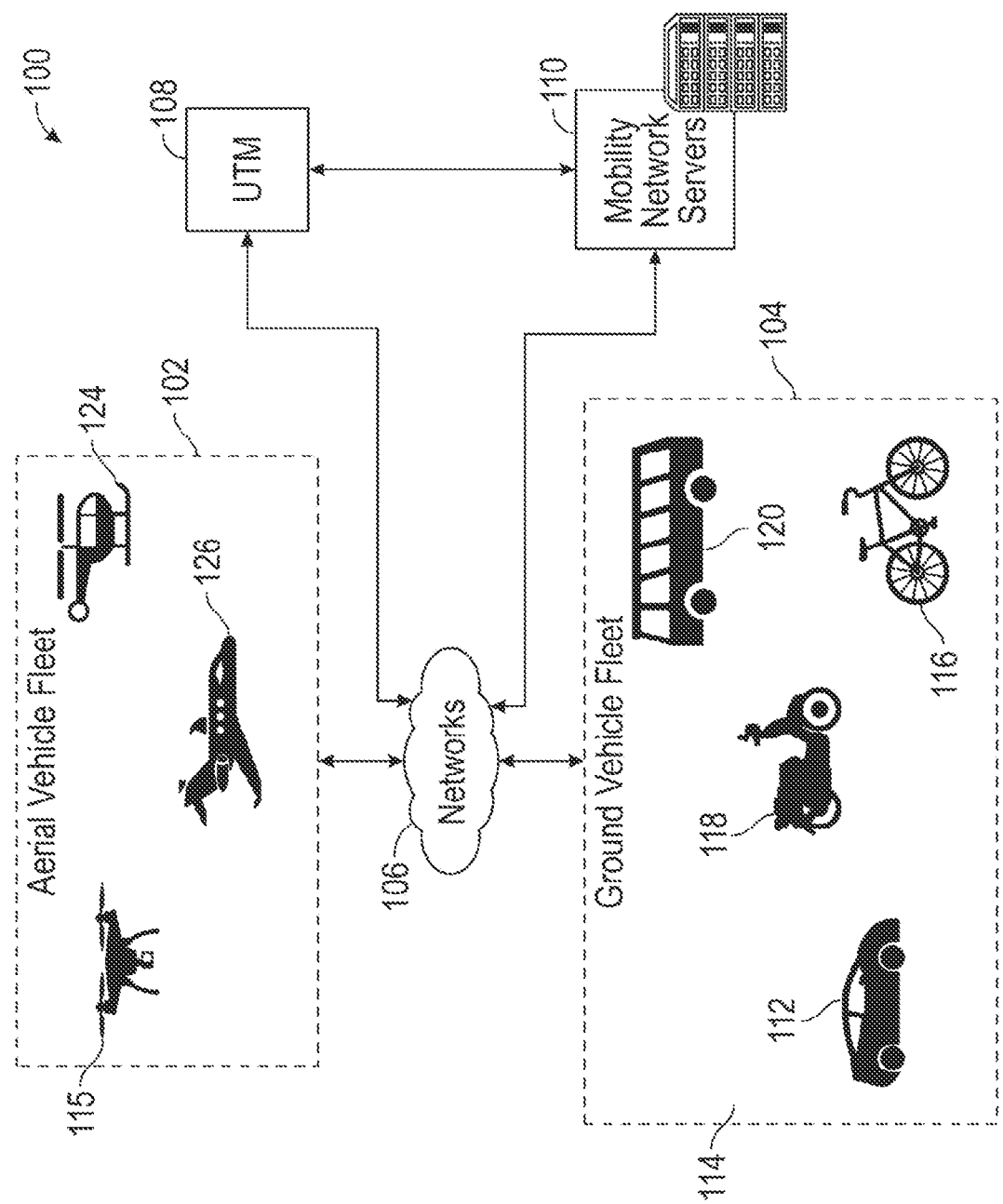

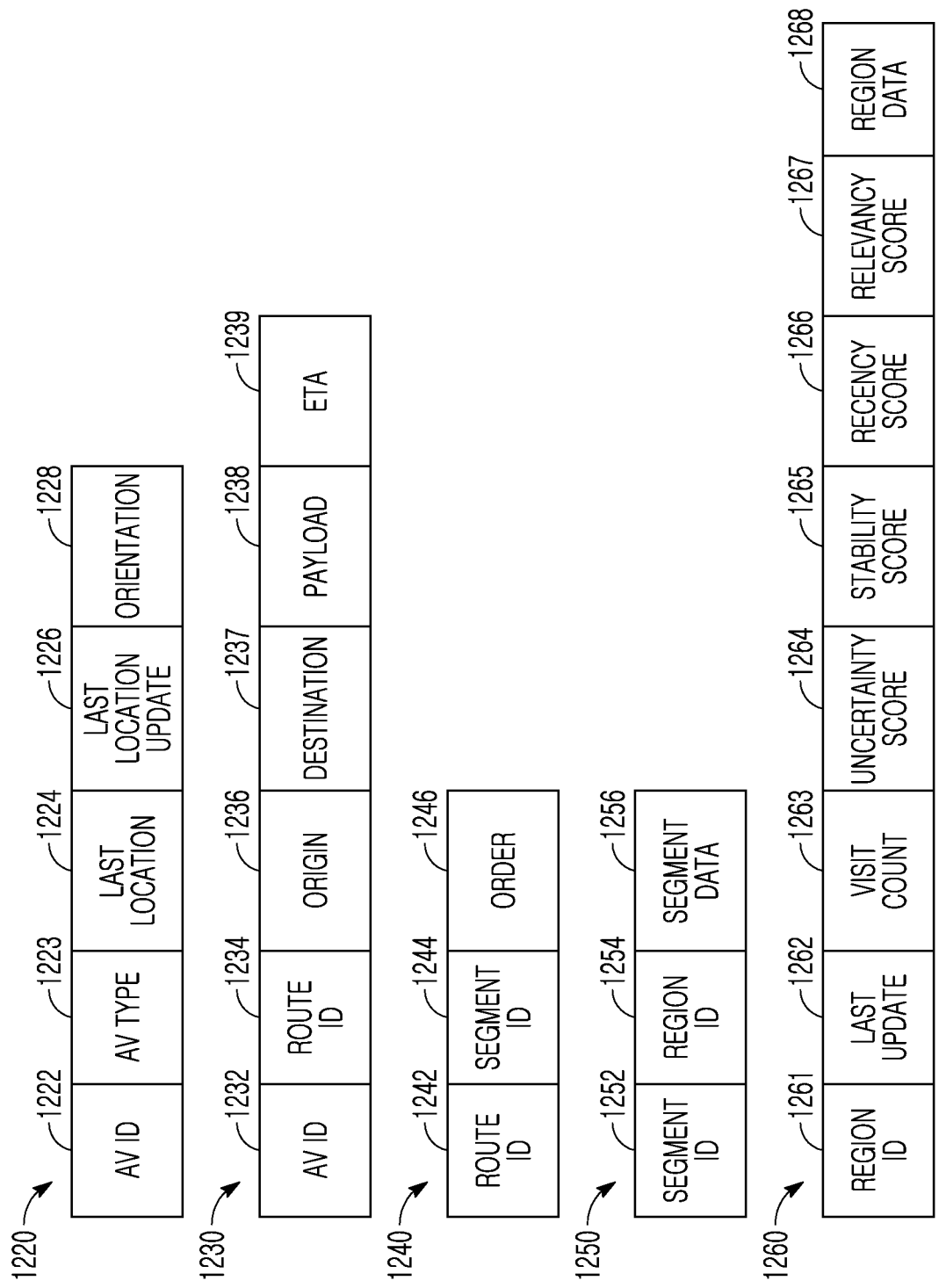

INTEGRATING AIR AND GROUND DATA COLLECTION FOR IMPROVED DRONE OPERATION

CROSS REFERENCE TO RELATED APPLICATIONS

This application claims priority to U.S. Provisional Application No. 62/901,156, filed Sep. 16, 2019, and entitled "Integrating Air and Ground Data Collection for Improved Drone Operation." The contents of this prior application are considered part of this application, and is hereby incorporated by reference in its entirety.

FIELD

This document pertains generally, but not by way of limitation, to devices, systems, and methods for operating and/or managing an autonomous vehicle.

BACKGROUND

Drone technology is evolving rapidly. This technology will provide for new transportation service business models. For example, the use of drone technology will result in significant cost reductions to vehicle operations. In traditional transportation, human drivers or pilots represent a significant portion of total operating costs. Moreover, human drivers or pilots are subject to errors in judgement that can result in accidents and represent a threat to safe operation of the vehicle. Unmanned operation promises to substantially reduce these issues.

To provide for unmanned operation, these vehicles include computer-based control systems that communicate with ground control computers to receive instructions and provide status information. This integration between ground-based computer control systems and drones can provide additional benefits beyond simply unmanned operation. For example, integrated control systems that control multiple unmanned vehicles may take advantage of additional efficiencies when synergies between the operation of multiple vehicles are identified. Thus, improved methods of integrating unmanned vehicle operations are needed.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

FIG. 1 is a schematic representation of an example transportation environment.

FIG. 12 shows example data structures, one or more of which may be implemented in one or more of the disclosed embodiments.

DETAILED DESCRIPTION

Figure 2A:
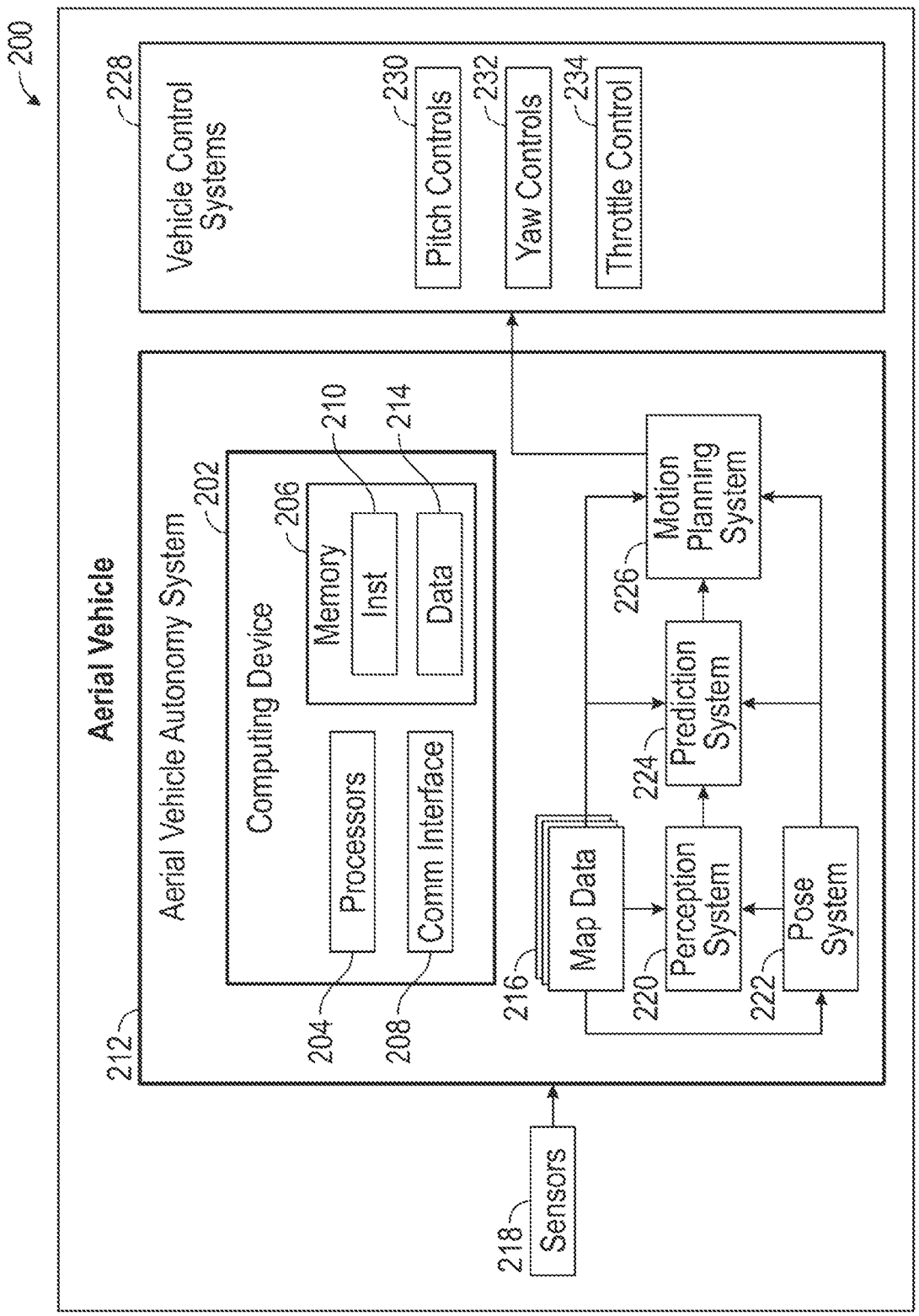
FIG. 2A depicts a block diagram of an aerial vehicle, according to example aspects of the present disclosure.

The disclosed embodiments augment data available to control a pool of drones. In some cases, one or more of drones may be a remotely controlled vehicle, that receives control information from a human operator over a wireless link. One or more of the drones may be an autonomous vehicle (AV). AVs are capable of performing at least some vehicle control without human input. The data is augmented by information collected from off-board sensors, such as information collected from a sensor positioned on a second drone. The information collected may include imaging data or audio data, which may include one or more of visual image information, light detection and ranging (LIDAR) information, radio detection and ranging (RADAR) information, and/or infra-red imaging information.

In some aspects, the information collected may be further processed before being provided to a drone operator of AV. Thus, the information may be derived from an image captured by the off-board sensor, and may include one or more of traffic alert information, object location and identification information, noise information, safety alert information, or other information derived from image and/or audio information collected by the AAV.

The collection of data from drones to augment the operation of another drone is prioritized along with other tasks assigned to the drones. For example, a drone may have an assigned objective, such as transporting cargo or other payload from an origin location to a destination location. A path the drone will travel from the origin location to the destination location overflies a ground region. Aerial imaging of the overflown region may or may not be relevant to autonomous vehicles operating below. Deviating from the flight path to capture more relevant ground regions may also have some negative effects or costs. For example, deviating from a planned route of travel may reduce margin associated with the aerial vehicles flight, for example, in terms of battery life and/or time to delivery of the payload. The deviation may also offer improved margin or value to one or more ground based drones.

The disclosed embodiments consider costs associated with drone tasking that deviates the drone from a predefined or current route to an alternate route in order to capture information relating to the ground environment. These costs are weighed against benefits to ground-based operations to determine whether such a deviation should be performed.

Aerial data collection may be especially advantageous when a ground environment is changing relatively rapidly. Depending on a number of ground vehicles in a region, data collected from ground vehicles may be inadequate to supply routing systems with enough information so as to accurately understand the environment in the region. Thus, the routing system may provide routing solutions that are less optimum than would otherwise be possible with more complete information. Thus, drone data capture may function to fill in missing information that is unable to be captured by ground assets (vehicles or fixed cameras for example).

In some embodiments, an operator may rent a vehicle for use by customers, but remain responsible for the vehicles proper parking and storage when not in use. Some embodiments may utilize a drone to capture information relating to a number and/or position of ground vehicles that remain in a stable location for some period of time. For example, some embodiments may receive location updates from vehicles, with the location updates indicating locations of the vehicles. These location updates may indicate a relative stability of the vehicle's position. If a vehicle remains in a single position for some predetermined period of time, it may be an indication that the vehicle is parked or potentially abandoned.

An operator of an drone and/or a service entity that oversees a fleet of one or more drones may have an interest in understanding a state of a vehicle that has been parked or abandoned by a customer. Thus, some of the disclosed embodiments may task a drone to overfly a position of a vehicle that has remained in a stable position for some period of time. The drone may capture an image of the vehicle. The image can then analyzed, either on-board the drone or via an off-board ground-based system, to determine if the vehicle is properly positioned in a manner that does not impose liability on the service entity. For example, the image may be analyzed to verify the vehicle is not blocking a right of way, is not on private property, or is otherwise positioned is such a manner as to cause risk to the service entity.

Depending on the results of the image analysis, remediation of the vehicle may be appropriate. For example, if the vehicle is improperly positioned, a maintenance vehicle, either autonomous or human operated, may be dispatched to attend to the vehicle.

In some aspects, one or more images may be captured of a region and analyzed. The analysis may identify multiple vehicles of interest in the region. The analysis may further determine that distribution of the multiple vehicles is sub-optimal based on one or more criterion. For example, the distribution of vehicles may deviate from a predetermined distribution. These one or more images further provide for a determination of a number of vehicles within one or more regions. These numbers of vehicles within the multiple regions may then be compared to a predetermined vehicle distribution specification to determine if redistribution is needed. If redistribution is needed, a maintenance vehicle, either autonomous or human operated, may be dispatched by the disclosed embodiments to implement the redistribution.

FIG. 1 is a schematic representation of a transportation environment 100, according in an example, in which an aerial vehicle fleet 102 and a ground vehicle fleet 104 provide mobility services (e.g., people transport, goods delivery).

Interactions, communications, and coordination of movement between vehicles of the aerial vehicle fleet 102(e.g., vertical take-off and landing (VTOL) vehicles 122, helicopters 124 and aircraft 126) and the ground vehicle fleet 104 (e.g., automobiles 112, bicycles 116, motorbikes 118, and busses 120) are facilitated through one or more mobility network server(s) 110 that are coupled via various networks 106 both the aerial vehicle fleet 102 and ground vehicle fleet 104. Specifically, the mobility network server(s) 110 may coordinate the acquisition of data from the various sensors of vehicles of the aerial vehicle fleet 102 in order to control the routing and operations of various vehicles of the ground vehicle fleet 104. The mobility network server(s) 110 likewise coordinate the acquisition of data from various sensors are vehicles of the ground vehicle fleet 104 in order to control the routing and operations of vehicles of the aerial vehicle fleet 102. For example, the mobility network server(s) 110 may control the acquisition of traffic monitoring data, by the aerial vehicle fleet 102, in order to assist in routing of vehicles of the ground vehicle fleet 104 by a routing engine 268 (discussed below with respect to FIG. 2B) that forms part of the mobility network server(s) 110.

The mobility network server(s) 110 is also coupled to an unmanned aerial vehicle traffic management system (UTM) 108, which operates to provide aircraft traffic management and de-confliction services to the aerial vehicle fleet 102. In one embodiment, the unmanned aerial vehicle traffic management system (UTM) 108 provides airspace management that various altitudes up to several thousand feet. The unmanned aerial vehicle traffic management system (UTM) 108 may also provide high-volume voiceless air traffic control interactions, and also integrates with air traffic control systems associated with airports. The mobility network server(s) 110 use connections provided by the unmanned aerial vehicle traffic management system (UTM) 108 to communicate with the vehicles of the aerial vehicle fleet 102, passing along routing and other information.

The acquisition of data for traffic monitoring, for example, by the aerial vehicle fleet 102 may be based on the aerial vehicles fly trips predetermined and/or optimized by an Unmanned Aerial System (UAS) traffic management (UTM) network. Connection to the unmanned aerial vehicle traffic management system (UTM) 108 is facilitated across multiple communications frequencies as needed for operation. Onboard telemetry of vehicles in the aerial vehicle fleet 102 is supplemented with GPS data in addition to other communication streams (GPS, 5G, etc.).

The unmanned aerial vehicle traffic management system (UTM) 108 is connected to the mobility network server(s) 110 that manage/oversee the operations of ground vehicles. This connection enables the multi-modality of urban air mobility (UAM) trips as well as the transfer of data pertinent to ground operations (traffic, vehicle locations). The unmanned aerial vehicle traffic management system (UTM) 108 further communicates with third-party UAS Service Suppliers (USS) and supplemental data service providers (SDSPs) to facilitate the transfer of data to these third-party services.

The mobility network server(s) 110 further perform pre-determination and/or optimization of trips of the aerial vehicle fleet 102 are based, for example, on the payload to be transported from a departing location to an arrival location (e.g., vertiport, fiducial, ad-hoc location). For example, flights by the aerial vehicle fleet 102 may be optimized to increase overall throughput, and thus efficiency of the system. Aircraft 126 and vertical take-off and landing (VTOL) vehicles 115 and helicopters 124 may fly within dynamically allocated sky lanes which enable safe, dense operation at scale. Allocation of these skyline's is determined by the mobility network server(s) 110 based on environmental acceptance (e.g., noise), weather, airspace deconfliction, and operational relevancy.

FIG. 2A depicts a block diagram of an aerial vehicle 200, according to example aspects of the present disclosure. The aerial vehicle 200 can be, for example, be an autonomous or semi-autonomous aerial vehicle. The aerial vehicle 200 includes one or more sensors 218, an aerial vehicle autonomy system 212, and one or more vehicle control systems 228.

The aerial vehicle autonomy system 212 can be engaged to control the aerial vehicle 200 or to assist in controlling the aerial vehicle 200. In particular, the aerial vehicle autonomy system 212 receives sensor data from the sensors 218, attempts to comprehend the environment surrounding the aerial vehicle 200 by performing various processing techniques on data collected by the sensors 218 and generates an appropriate motion path through an environment. The aerial vehicle autonomy system 212 can control the one or more vehicle control systems 228 to operate the aerial vehicle 200 according to the motion path.

The aerial vehicle autonomy system 212 includes a perception system 220, a prediction system 224, a motion planning system 226, and a pose system 222 that cooperate to perceive the surrounding environment of the aerial vehicle 200 and determine a motion plan for controlling the motion of the aerial vehicle 200 accordingly.

Various portions of the aerial vehicle autonomy system 212 receive sensor data from the sensors 218. For example, the sensors 218 may include remote-detection sensors as well as motion sensors such as an inertial measurement unit (IMU), one or more encoders, etc. The sensor data can include information that describes the location of objects within the surrounding environment of the aerial vehicle 200, information that describes the motion of the vehicle, etc.

The sensors 218 may also include one or more remote-detection sensors or sensor systems, such as a LIDAR, a RADAR, one or more cameras, etc. As one example, a LIDAR system of the sensors 218 generates sensor data (e.g., remote-detection sensor data) that includes the location (e.g., in three-dimensional space relative to the LIDAR system) of a number of points that correspond to objects that have reflected a ranging laser. For example, the LIDAR system can measure distances by measuring the Time of Flight (TOF) that it takes a short laser pulse to travel from the sensor to an object and back, calculating the distance from the known speed of light.

As another example, for a RADAR system of the sensors 218 generates sensor data (e.g., remote-detection sensor data) that includes the location (e.g., in three-dimensional space relative to the RADAR system) of a number of points that correspond to objects that have reflected ranging radio waves. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, one or more cameras of the sensors 218 may generate sensor data (e.g., remote sensor data) including still or moving images. Various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in image or images captured by the one or more cameras. Other sensor systems can identify the location of points that correspond to objects as well.

As another example, the sensors 218 can include a positioning system. The positioning system can determine a current position of the aerial vehicle 200. The positioning system can be any device or circuitry for analyzing the position of the aerial vehicle 200. For example, the positioning system can determine a position by using one or more of inertial sensors, a satellite positioning system such as a Global Positioning System (GPS), based on IP address, by using triangulation and/or proximity to network access points or other network components (e.g., cellular towers, WiFi access points, etc.) and/or other suitable techniques. The position of the aerial vehicle 200 can be used by various systems of the aerial vehicle autonomy system 212.

Thus, the sensors 218 can be used to collect sensor data that includes information that describes the location (e.g., in three-dimensional space relative to the aerial vehicle 200) of points that correspond to objects within the surrounding environment of the aerial vehicle 200. In some implementations, the sensors 218 can be located at various different locations on the aerial vehicle 200. As an example, one or more cameras, RADAR and/or LIDAR sensors.

The pose system 222 receives some or all of the sensor data from the sensors 218 and generates vehicle poses for the aerial vehicle 200. A vehicle pose describes the position (including altitude) and attitude of the vehicle. The position of the aerial vehicle 200 is a point in a three dimensional space. In some examples, the position is described by values for a set of Cartesian coordinates, although any other suitable coordinate system may be used. The attitude of the aerial vehicle 200 generally describes the way in which the aerial vehicle 200 is oriented at its position. In some examples, attitude is described by a yaw about the vertical axis, a pitch about a first horizontal axis and a roll about a second horizontal axis. In some examples, the pose system 222 generates vehicle poses periodically (e.g., every second, every half second, etc.) The pose system 222 appends time stamps to vehicle poses, where the time stamp for a pose indicates the point in time that is described by the pose. The pose system 222 generates vehicle poses by comparing sensor data (e.g., remote sensor data) to map data 216 describing the surrounding environment of the aerial vehicle 200.

In some examples, the pose system 222 includes localizers and a pose filter. Localizers generate pose estimates by comparing remote sensor data (e.g., LIDAR, RADAR, etc.) to map data. The pose filter receives pose estimates from the one or more localizers as well as other sensor data such as, for example, motion sensor data from an IMU, encoder, odometer, etc. In some examples, the pose filter executes a Kalman filter or other machine learning algorithm to combine pose estimates from the one or more localizers with motion sensor data to generate vehicle poses. In some examples, localizers generate pose estimates at a frequency less than the frequency at which the pose system 222 generates vehicle poses. Accordingly, the pose filter generates some vehicle poses by extrapolating from a previous pose estimates.

The perception system 220 detects objects in the surrounding environment of the aerial vehicle 200 based on the sensor data, the map data 216 and/or vehicle poses provided by the pose system 222. The map data 216, for example, may provide detailed information about the surrounding environment of the aerial vehicle 200. The map data 216 can provide information regarding: the route(s) and/or skylane(s) that the aerial vehicle 200 is to traverse, route(s) and/or skylanes; the position of other aerial vehicles; the location, attitude, orientation, and/or other parameters of vertiports or landing zones, weather data (e.g., weather radar data), noise map data and/or any other map data that provides information that assists the aerial vehicle autonomy system 212 in comprehending and perceiving its surrounding environment and its relationship thereto. The prediction system 224 uses vehicle poses provided by the pose system 222 to place aerial vehicle 200 environment.

In some examples, the perception system 220 determines state data for objects in the surrounding environment of the aerial vehicle 200. State data may describe a current state of an object (also referred to as features of the object). The state data for each object describes, for example, an estimate of the object's: current location (also referred to as position); current speed (also referred to as velocity); current acceleration; current heading; current orientation; size/shape/footprint (e.g., as represented by a bounding shape such as a bounding polygon or polyhedron); type/class (e.g., vehicle versus pedestrian versus bicycle versus other); yaw rate; distance from the aerial vehicle 200; minimum path to interaction with the aerial vehicle 200; minimum time duration to interaction with the aerial vehicle 200; and/or other state information.

In some implementations, the perception system 220 can determine state data for each object over a number of iterations. In particular, the perception system 220 can update the state data for each object at each iteration. Thus, the perception system 220 can detect and track objects, such as vehicles, that are proximate to the aerial vehicle 200 over time.

The prediction system 224 is configured to predict future positions for an object or objects in the environment surrounding the aerial vehicle 200 (e.g., an object or objects detected by the perception system 220). The prediction system 224 can generate prediction data associated with objects detected by the perception system 220. In some examples, the prediction system 224 generates prediction data describing each of the respective objects detected by the perception system 220.

Prediction data for an object can be indicative of one or more predicted future locations of the object. For example, the prediction system 224 may predict where the object will be located within the next 5 seconds, 20 seconds, 200 seconds, etc. Prediction data for an object may indicate a predicted trajectory (e.g., predicted path) for the object within the surrounding environment of the aerial vehicle 200. For example, the predicted trajectory (e.g., path) can indicate a path along which the respective object is predicted to travel over time (and/or the speed at which the object is predicted to travel along the predicted path). The prediction system 224 generates prediction data for an object, for example, based on state data generated by the perception system 220. In some examples, the prediction system 224 also considers one or more vehicle poses generated by the pose system 222 and/or the map data 216.

In some examples, the prediction system 224 uses state data indicative of an object type or classification to predict a trajectory for the object. As an example, the prediction system 224 can use state data provided by the perception system 220 to determine that particular object (e.g., an object classified as a vehicle). The prediction system 224 can provide the predicted trajectories associated with the object(s) to the motion planning system 226.

In some implementations, the prediction system 224 is a goal-oriented prediction system that generates potential goals, selects the most likely potential goals, and develops trajectories by which the object can achieve the selected goals. For example, the prediction system 224 can include a scenario generation system that generates and/or scores the goals for an object and a scenario development system that determines the trajectories by which the object can achieve the goals. In some implementations, the prediction system 224 can include a machine-learned goal-scoring model, a machine-learned trajectory development model, and/or other machine-learned models.

The motion planning system 226 determines a motion plan for the aerial vehicle 200 based at least in part on the predicted trajectories associated with the objects within the surrounding environment of the aerial vehicle 200, the state data for the objects provided by the perception system 220, vehicle poses provided by the pose system 222, and/or the map data 216. Stated differently, given information about the current locations of objects and/or predicted trajectories of objects within the surrounding environment of the aerial vehicle 200, the motion planning system 226 can determine a motion plan for the aerial vehicle 200 that best navigates the aerial vehicle 200 relative to the objects at such locations and their predicted trajectories on acceptable routes.

In some implementations, the motion planning system 226 can evaluate cost functions and/or one or more reward functions for each of one or more candidate motion plans for the aerial vehicle 200. For example, the cost function(s) can describe a cost (e.g., over time) of adhering to a particular candidate motion plan while the reward function(s) can describe a reward for adhering to the particular candidate motion plan. For example, the reward can be of opposite sign to the cost.

Thus, given information about the current locations and/or predicted future locations/trajectories of objects, the motion planning system 226 can determine a total cost (e.g., a sum of the cost(s) and/or reward(s) provided by the cost function(s) and/or reward function(s)) of adhering to a particular candidate pathway. The motion planning system 226 can select or determine a motion plan for the aerial vehicle 200 based at least in part on the cost function(s) and the reward function(s). For example, the motion plan that minimizes the total cost can be selected or otherwise determined. The motion plan can be, for example, a path along which the aerial vehicle 200 will travel in one or more forthcoming time periods. In some implementations, the motion planning system 226 can be configured to iteratively update the motion plan for the aerial vehicle 200 as new sensor data is obtained from the sensors 218. For example, as new sensor data is obtained from the sensors 218, the sensor data can be analyzed by the perception system 220, the prediction system 224, and the motion planning system 226 to determine the motion plan.

Each of the perception system 220, the prediction system 224, the motion planning system 226, and the pose system 222, can be included in or otherwise a part of the aerial vehicle 200 configured to determine a motion plan based on data obtained from the sensors 218. For example, data obtained by the sensors 218 can be analyzed by each of the perception system 220, the prediction system 224, and the motion planning system 226 in a consecutive fashion in order to develop the motion plan. While FIG. 2A depicts elements suitable for use in a vehicle autonomy system according to example aspects of the present disclosure, one of ordinary skill in the art will recognize that other vehicle autonomy systems can be configured to determine a motion plan for an autonomous vehicle based on sensor data.

The motion planning system 226 can provide the motion plan to vehicle control systems 228 to execute the motion plan. For example, the vehicle control systems 228 can include pitch control module 230, yaw control module 232, and a throttle control system 234, each of which can include various vehicle controls (e.g., actuators or other devices or motors that control power) to control the motion of the aerial vehicle 200. The various vehicle control systems 228 can include one or more controllers, control devices, motors, and/or processors.

A throttle control system 234 is configured to receive all or part of the motion plan and generate a throttle command. The throttle command is provided to an engine and/or engine controller, or other propulsion system component to control the engine or other propulsion system of the aerial vehicle 200.

The aerial vehicle autonomy system 212 includes one or more computing devices, such as the computing device 202 which may implement all or parts of the perception system 220, the prediction system 224, the motion planning system 226 and/or the pose system 222. The example computing device 202 can include one or more processors 204 and one or more memory devices (collectively referred to as memory 206). The processors 204 can be any suitable processing device (e.g., a processor core, a microprocessor, an Application Specific Integrated Circuit (ASIC), a Field Programmable Gate Array (FPGA), a microcontroller, etc.) and can be one processor or a plurality of processors that are operatively connected. The memory 206 can include one or more non-transitory computer-readable storage mediums, such as Random Access Memory (RAM), Read Only Memory (ROM), Electrically Erasable Programmable Read Only Memory (EEPROM), Erasable Programmable Read Only Memory (EPROM), flash memory devices, magnetic disks, etc., and combinations thereof. The memory 206 can store data 214 and instructions 210 which can be executed by the processors 204 to cause the aerial vehicle autonomy system 212 to perform operations. The computing device 202 can also include a communications interface 208, which can allow the computing device 202 to communicate with other components of the aerial vehicle 200 or external computing systems, such as via one or more wired or wireless networks. Additional descriptions of hardware and software configurations for computing devices, such as the computing device 202 are provided herein.

Figure 2B:
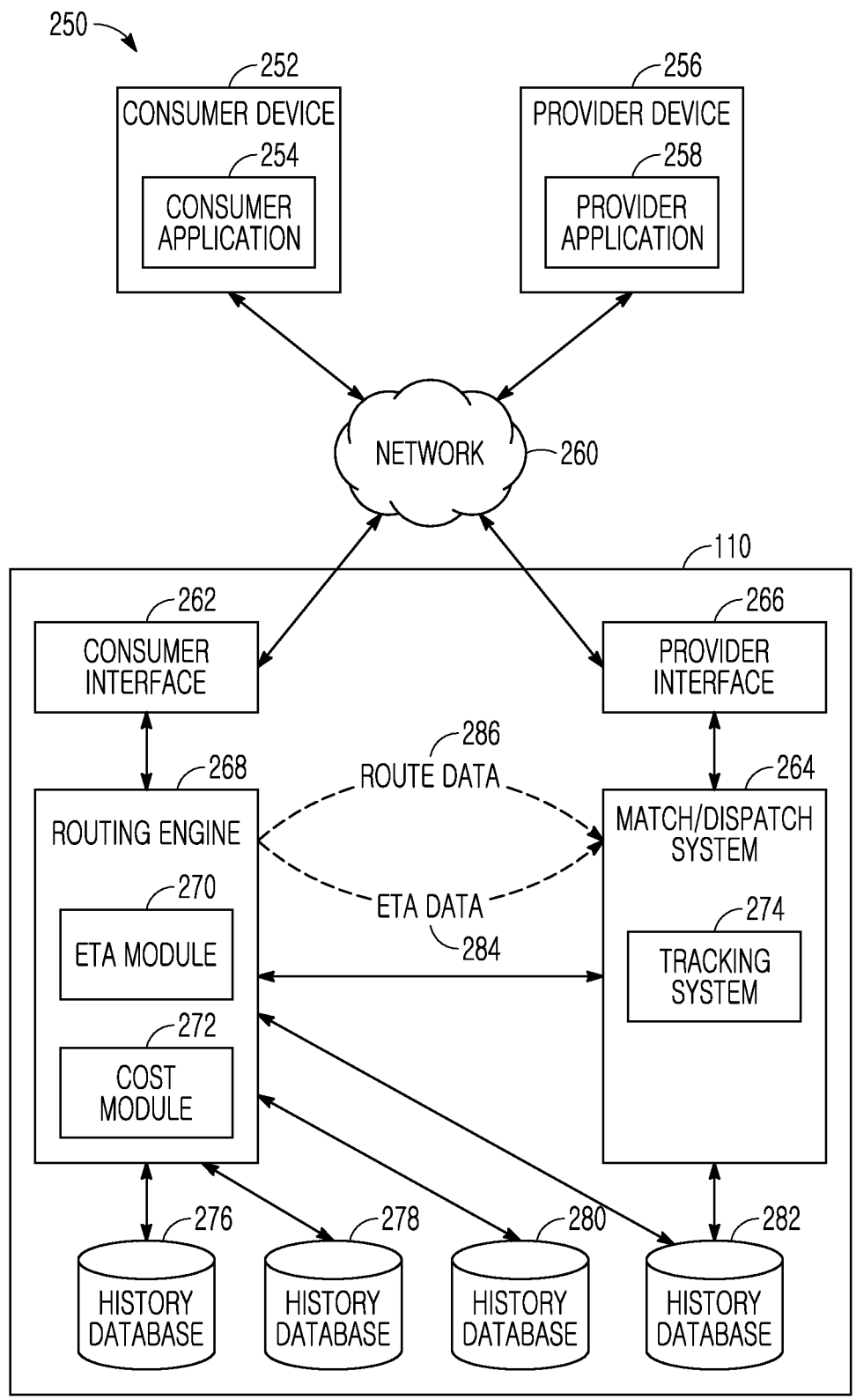
FIG. 2B is a diagrammatic representation of example mobility network server(s) operating within a networked environment.

FIG. 2B is a diagrammatic representation of a mobility network server(s) 110, operating within a networked environment 250, according to some example embodiments. The mobility network server(s) 110 operatively facilitates delivery of a service by a service provider to a service consumer. In some example embodiments, the mobility network server(s) 110 is dedicated to a particular vertical and may focus on the delivery of a single service (e.g., a transportation service for the transportation of either persons or goods). In other embodiments, the mobility network server(s) 110 operates to enable the delivery of services across a range of different verticals and service types. A service provider may be a human service provider, a fully automated service provider, or a combination thereof. For example, where the service provider is a transportation service, the transportation vehicle may be a human-piloted vehicle, such as an automobile or aircraft, a fully autonomous vehicle, or a combination of human-piloted and autonomous vehicles may be deployed to deliver the transportation service.

FIG. 2B shows the mobility network server(s) 110 to be communicatively coupled via a network 260 to both a service consumer device 252 and a service provider device 256. The consumer device 252 hosts and executes a service consumer application 254, while the service provider device 256 hosts and executes a service provider application 258. In one embodiment, the consumer device 252 is a mobile computing device (e.g., a mobile telephone), executing a service consumer application 254 downloaded from an appropriate app store (e.g., the Uber application that executes on either iOS or the Android operating systems). Similarly, the service provider device 256 may be a mobile computing device, and the service provider application 258 may be an application designed to run on a mobile operating system (e.g., iOS or Android operating systems). The mobility network server(s) 110 may also interface with other types of devices, such as desktop computers, third-party service systems, and cloud-based computing systems.

The mobility network server(s) 110 includes a consumer interface 262 (e.g., an appropriate set of Application Program Interfaces (APIs)) for facilitating communications, via the network 260, with the consumer device 252. Similarly, a provider interface 266 (e.g., again, a suitable set of APIs) facilitates communications between the mobility network server(s) 110 and the service provider device 256.

In the example embodiment in which the consumer interface 262 and the provider interface 266 comprise APIs, these APIs may also facilitate interactions between the mobility network server(s) 110 and third-party applications hosted on various devices. For example, where the mobility network server(s) 110 is a transportation service system, third-party applications may include widgets or buttons that enable a user to specify and deliver a service request from the third-party application to the transportation service.

The consumer interface 262 is communicatively coupled, and provides interactive access, to both a routing engine 268 and a match/dispatch engine 264 of the mobility network server(s) 110. Similarly, the provider interface 266 is communicatively coupled, and provides interactive access, to both the routing engine 268 and the match/dispatch engine 264. At a high level, the routing engine 268 operatively generates route data 286 to facilitate the provision of services from a service provider to a service consumer. For example, the routing engine 268 may generate route data 286 to route a service provider to a location at which a service consumer is located or vice versa. Further, where the service is transportation service (e.g., of a person or a good), the routing engine 268 generates route data 286 to assist the service provider in delivering the transportation service. The routing engine 268 further includes an Estimated Time of Arrival ETA module 270 that generates ETA data 284. The ETA data 284 may relate to the ETA of a service provider at a service consumer (e.g., a driver at a pickup location for a passenger), the ETA of a consumer at a service provider location (e.g., where a consumer travels to a service provider location for delivery of the service), or an ETA for the destination arrival for a transportation service (e.g., the drop off of a passenger or delivery of a cargo).

In order to generate the route data 286 and ETA data 284, the routing engine 268, in addition to receiving information from the consumer device 252 and service provider device 256, has access to a map database 276, a place database 278, a history database 280, and a user database 282. The map database 276 contains records for transportation infrastructure (e.g., data reflecting an air, road network, rail network, or other transportation route network). In one embodiment, the map database 276 may include OpenStreetMap (OSM)

data or other proprietary road network data. In one embodiment, the routing engine 268 may include an Open Source Routing Machine (OSRM) engine or any one of several other proprietary routing engines.

The routing engine 268 may also deploy a number of segment cost models (e.g., within a cost module 272), algorithms and data processing techniques in order to generate the route data 286 and the ETA data 284. In one embodiment, the routing engine 268 uses an informed search algorithm, such as A*, to perform low-cost pathfinding and graph traversal by attributing costs of paths or segments between nodes on a graph map (e.g., generated from the map database 276 and the place database). The routing engine 268 may use dynamic contraction hierarchies as part of a routing algorithm. Sharding (e.g., breaking up graphs into geographic regions) may also be used to improve the performance, while the A* or Dijkstra's search algorithm with heuristics, may be used to prioritize nodes in a graph map to generate the route data 286.

The routing engine 268, as will be described in further detail below, may also attribute different costs to segments (or adjust the costs of segments), based on various observed (e.g., in near real-time) or known characteristics of an area or region to be traversed (e.g., weather conditions or the grade or surface condition of a road) and/or a vehicle (e.g., automobiles 112, bicycles 116, aerial vehicle fleet 102, motorbikes 118).

The map database 276 stores map data according to various formats and standards, such as the road or route map data roads and transport links formatted as an OSM file. The map data may conform to topological data structures and include multiple types of map data primitives, such as segments, nodes, ways, and relationships. Furthermore, the map database 276 may store Open cyclist Map (OCM) data, this data complying with a map format developed for cyclists and used by OSM. These maps include key information for cyclists, such as national, regional, and local roads, as well as cycle paths and footpaths. Records within the map database 276 may be formatted as .OSM files, or as shapefiles, which is a format used for storing vector geographic data. Further, the data within the map database 276 may use a topological data structure (e.g., when formatted as an OSM file), with multiple core elements or data primitives. Specifically, these data elements include nodes (points with a geographic location, stored as latitude and longitude coordinates), ways (ordered list of nodes representing a polyline or possibly a polygon), relations (ordered lists of nodes, ways and relations, where each member can have a "role"), and tags (key-value pairs used to store metadata about map objects). Other examples of map data include HERE TECHNOLOGIES map data (Nokia), TELE ATLAS map data (TomTom), or GOOGLE MAP data.

The place database 278 includes place data in the form of records for various places and locations, these records being used to supplement the map data from the map database 276 when generating the route data 286. Specifically, a place record within the place database 278 includes multiple names or other identifiers for specific locations (e.g., a restaurant or a shop), as well as latitude and longitude information. This place data may be used to more accurately identify a location specified in a request received from either a service consumer or provider.

The history database 280 stores historical information regarding past trips (e.g., GPS trace routes, logs and reroute incidents). This historical information is used by the routing engine 268, and more specifically the ETA module 270, in order to generate accurate ETA data 284. For example, historical data within the history database 280 may be used by the ETA module 270 to modify or adjust ETA data 284, based on historical traffic patterns within segments of a particular route.

The match/dispatch engine 264, in one example embodiment, operates as a dispatch system. Specifically, the match/dispatch engine 264 operatively matches a service request, received from a consumer device 252 with an available service provider. When operating as a dispatch system, the match/dispatch engine 264 may match a particular service consumer with a particular service provider based on a number of factors, such as the geographic proximity of the respective parties and the current or future availability of the relevant service provider. To this end, the match/dispatch engine 264 accesses tracking system 274, which receives input from the service provider device 256 regarding a current geographic location of a service provider, as well as geographic location information from the consumer device 252 regarding the current location of a consumer. The tracking system 274 actively communicates geographic location information regarding either a consumer device 242 and/or a service provider device 256 to the ETA module 270, both prior to and during a service delivery operation, to enable the ETA module 270 to dynamically update ETA data 284. The match/dispatch engine 264 actively communicates updated ETA data 284 to both the consumer device 252 and the service provider device 256.

To perform service matching operations, the match/dispatch engine 264 is communicatively coupled to, and has access to, the user database 282. The user database 282 maintains user records for both service providers and service consumers. The routing engine 268 likewise has access to the user database 282 and, as will be described in further detail herein, uses user profile information maintained within the user database 282, to personalize the route data 286 for either a service consumer or a service provider (e.g., a transportation service provider).

Figure 3:
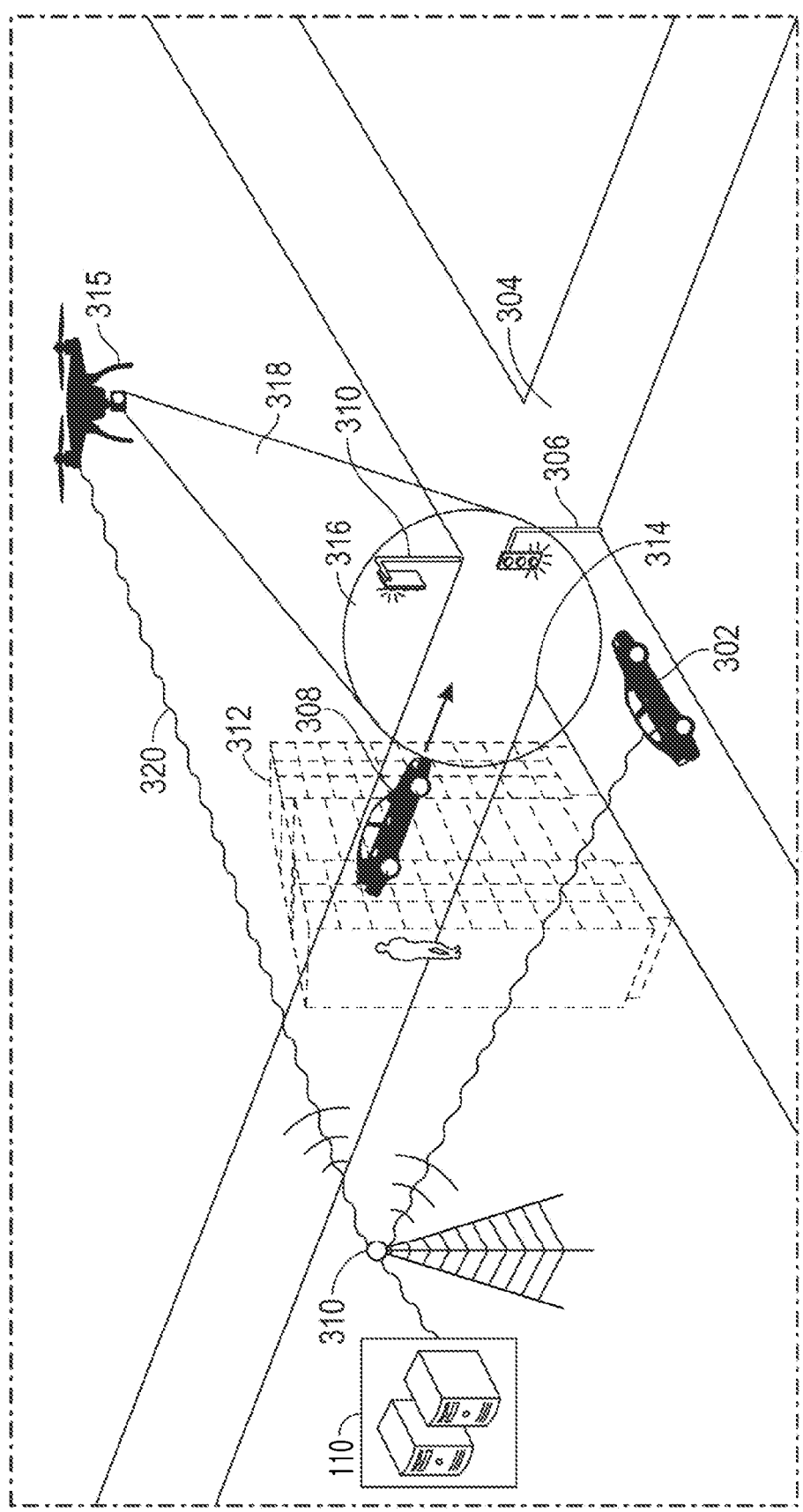
FIG. 3 is an overview diagram of an example autonomous vehicle environment.

FIG. 3 is an overview diagram of an example autonomous vehicle environment. An autonomous vehicle 302 is shown approaching an intersection 304. A traffic light 306 at the intersection is showing a green light for the autonomous vehicle 302. Approaching the intersection 304 from a different direction is another vehicle 308. Since the autonomous vehicle 302 has a green light, it will enter the intersection 304.

A building 312 positioned at a corner 314 of the intersection 304 prevents sensors located on the autonomous vehicle 302 from detecting the other vehicle 308. Moreover, the other vehicle 308 is influenced by a second traffic light 310. As such, the autonomous vehicle 302 may have a higher level of uncertainty or a lower level of confidence in its planned motion trajectory at the intersection 304. In some embodiments, this lower confidence and/or high uncertainty may result in the AV 302 performing actions to mitigate the high uncertainty/low confidence. For example, the AV 302 may reduce its speed before entering the intersection 304 to provide additional time for on-board sensors to acquire additional data on the scene 316 than is otherwise obscured when the autonomous vehicle 302 is further away from the intersection 304. In some other embodiments, the AV 302 may request remote assistance, such as assistance from a tele-assistance human operator, as a result of its reduced confidence and/or higher uncertainty resulting from the occlusion. These additional actions taken by the AV 302 as a result of the occlusion caused by the building 312 may reduce efficiency of operation of the AV 302.

Some of the disclosed embodiments make use of imagery captured from secondary platforms to assist an AV, such as the AV 302, in navigating through regions from which on-board sensors may be unable to acquire data sufficient to ensure high confidence and/or low uncertainty.

FIG. 3 shows an autonomous aerial vehicle 315 is in flight above the intersection 304 and is able to image the scene 316 of the intersection 304 via a field of view 318 of an onboard camera. An image of the scene 316 is transmitted over a wireless connection 320 to a mobility network server(s) 110. The route information system 322 may then distribute information on the scene 316 to the autonomous vehicle 302. A control system within the autonomous vehicle 302 (not shown) may then navigate the autonomous vehicle 302 based on one or more images captured by the AAV 315. For example, in some aspects, the additional imagery from the AAV 315 may provide for reduced uncertainty/higher confidence of a planned motion trajectory of the autonomous vehicle 302 before it enters the intersection 304. In some cases, this may result in the autonomous vehicle 302 continuing on its preplanned path/trajectory and entering the intersection at a nominal rate of speed. This may avoid the need for the AV 302 to reduce its speed due to high uncertainty/low confidence as discussed above, resulting in overall improved efficiency of operation of the AV 302.

Figure 4:
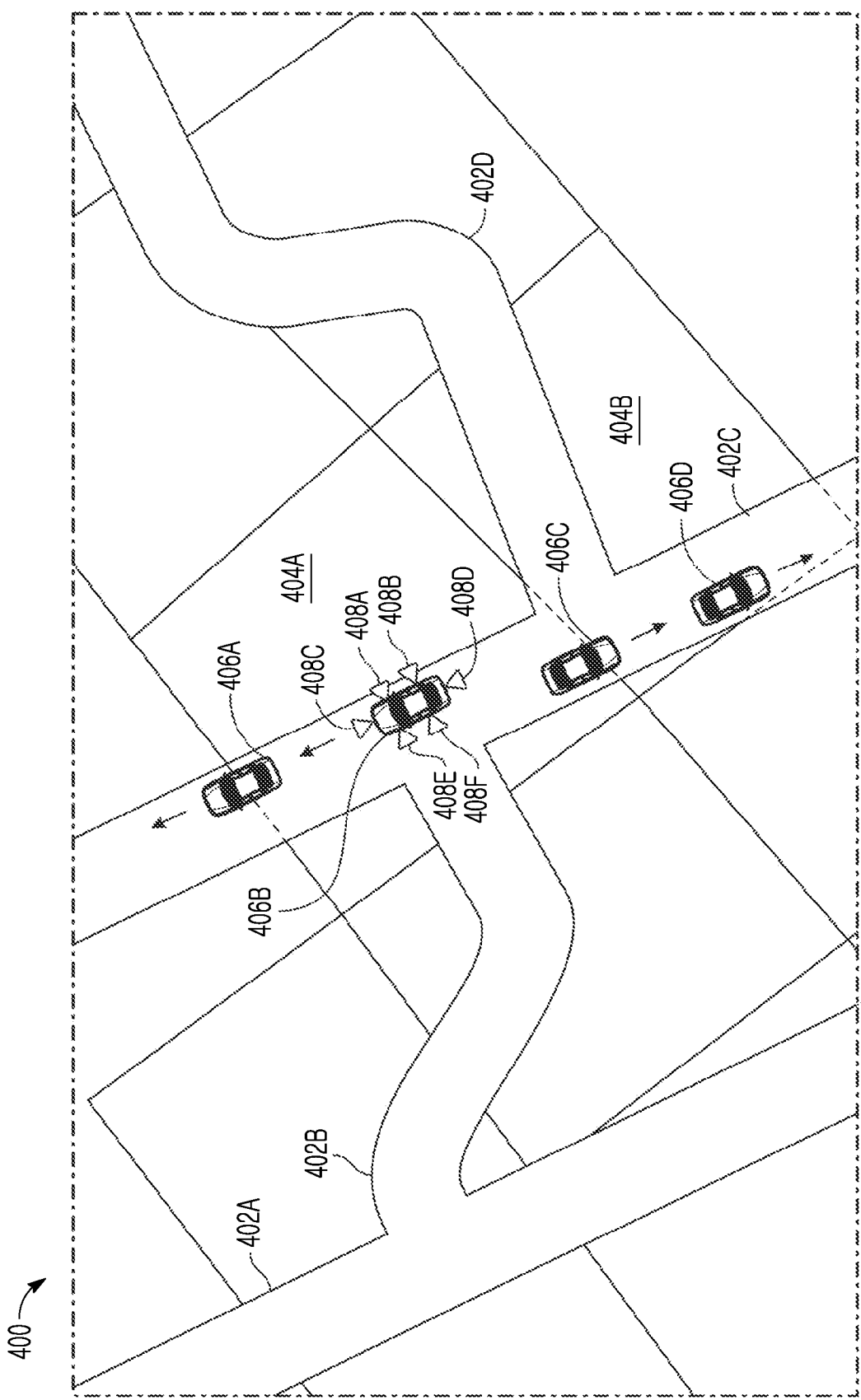
FIG. 4 shows an image of a scene.

FIG. 4 shows an image of a scene 400 The scene 400 includes several roads 402a-d. The scene is also segmented into various regions, examples of which are labeled as 404a-d (not all regions are labeled to preserve figure clarity). The scene 400 illustrates several vehicles 406a-d on the road 402c. The vehicles 406a-d on the road 402c may capture data using on-board sensors. Thus, in the example of FIG. 4, the vehicles 406a-d are capturing sensor data. An example of sensor field of views of the vehicle 406b are shown as 408a-f. Data collected from the sensor fields of view 408a-f provides information on the region 404a to a control system of the vehicle 406b (not shown). Similarly, the vehicle 406d collects sensor data (not shown) for at least a portion of the region 404b. Each of the vehicles 406a-d may upload this data to the mobility network server(s) 110.

Sensor data obtained from the field of views 408a-f is provided by the vehicle 406b to the mobility network server(s) 110 of FIG. 1. The mobility network server(s) 110 may distribute the data provided by the vehicle 406b to other vehicles navigating through the region 404a. Furthermore, the mobility network server(s) 110 may score each of the regions 404a-d based on how recently data for the region has been collected. Thus, upon receiving data from the sensor field of views 408a-f, the mobility network server(s) 110 may update a recency score for regions included in the sensor field of views 408a-f.

In the example of FIG. 4, the region 404a may be assigned a recency score that reflects the collection of the data from sensor field of views 408a-f within a period of time. Similarly, each of the other regions 404b-d may also be assigned a recency score based on data collected from those regions. Each of the regions is also assigned a stability score. The stability score may characterize a level of activity within the region that may cause changes in the navigation environment within the region. Thus, for example, urban city streets may be assigned a lower stability score than rural country roads.

Each of the regions 404a-d may also be assigned a relevancy score. The relevancy score may reflect an amount of autonomous vehicle activity within the region. Thus, for example, roads frequently traveled by autonomous vehicles may be assigned a relevancy score higher than roads infrequently traveled by autonomous vehicles. In some aspects, the relevancy scores may be modified depending on time of day, date, or other conditions. Thus, for example, a commercial area may have a higher relevancy score during business hours and then be assigned a lower relevancy score during off hours. The disclosed embodiments may collect historical information describing autonomous vehicle activity in various regions over various periods of time. Based on this historical information, the disclosed embodiments may update relevancy scores of the various regions based on historical usage of each region during particular time periods.

The disclosed embodiments may prioritize data collection for a region based on at least one or more of the recency score, stability score, and relevancy score. Thus, regions may be ranked against each other based on the recently score, stability score, or relevancy score. For example, a region having low stability, low recency, but high relevancy may be ranked above another region having higher stability and/or higher recency and/or lower relevancy.

The ranking or prioritization of the regions may determine requests for imaging of the regions by aerial vehicles, as discussed further below.

Figure 5:
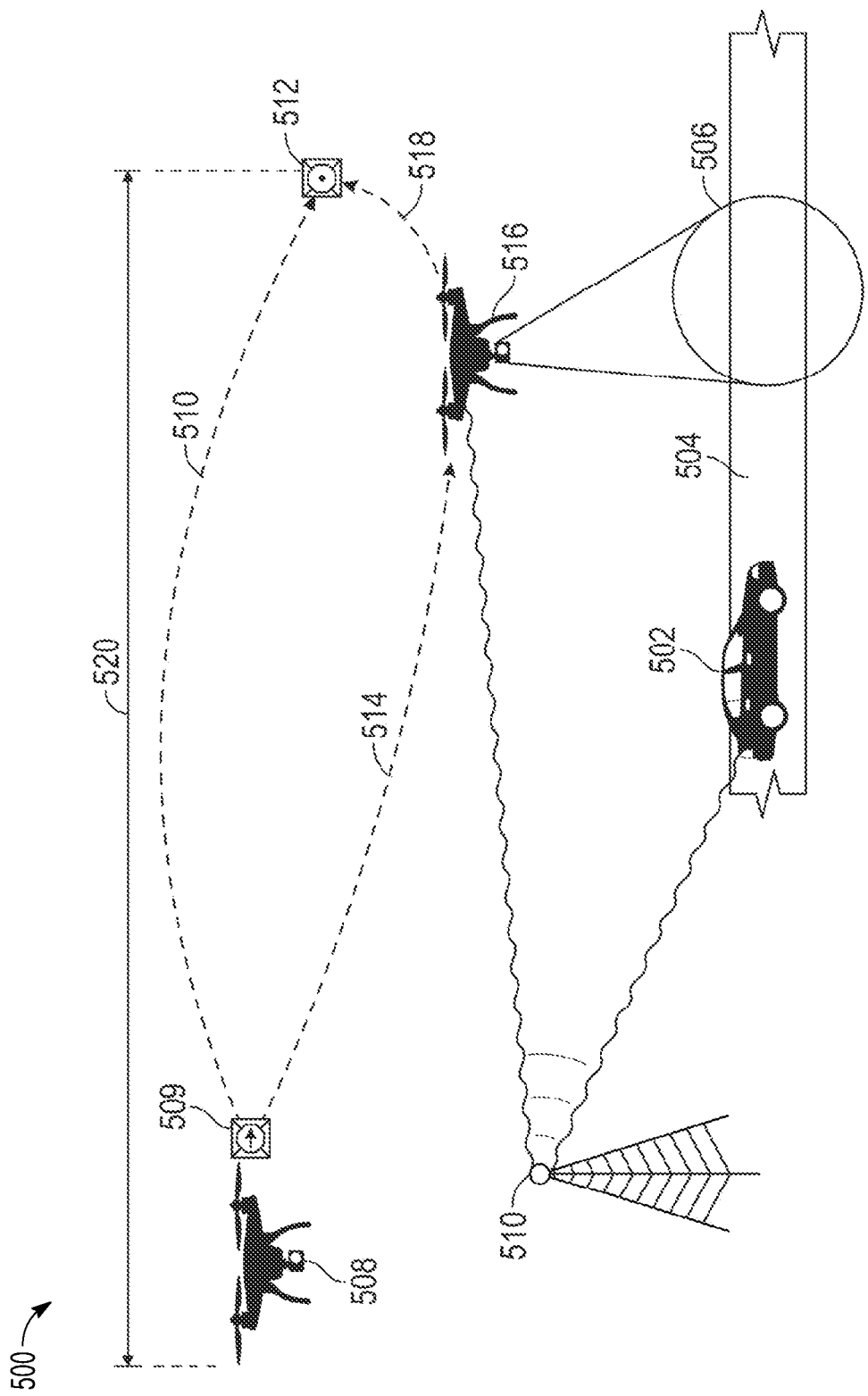
FIG. 5 is a diagram showing aerial drone data collection to augment operation of a ground-based drone.

FIG. 5 is a diagram showing aerial vehicle data collection to augment operation of an AGV. The scene 500 shows an autonomous vehicle 502 traveling on a road 504. The road 504 runs through a region 506. The scene 500 also shows an aerial vehicle 508 that is traveling via a route 510 to a destination 512. The region 506 may have one or more of relatively low stability, recency, and/or high relevancy, and thus may be ranked highly enough by the mobility network server(s) 110 to task an AAV 508 to image the region 506.

Thus, the AAV 508 deviates from the route 510 and follows a new route 514 to a position 516 so as to image the region 506. The aerial vehicle 508 then proceeds to the destination 512 via an alternate route 518.

While the mobility network server(s) 110 may consider the ranking of the region 506 when tasking the aerial vehicle 508 to image the region 506, one or more parameters of the AAV 508 are also considered. For example, the aerial vehicle has a particular distance to travel between its current position 509 to the destination 512, shown as distance 520. Deviating from the route 510 to instead travel to the position 516 results in a modified travel distance relative to route 510. In particular, the distance traveled is a distance comprised of the route 514 and the alternate route 518. This distance is larger than distance 520. Additionally, the AAV 508 will expend more energy traveling this additional distance relative to energy required to travel distance 520. This additional energy expenditure will result in the AAV 508 having a lower battery level when arriving at destination 512 when compared to a second battery level when arrived at destination 512 via route 510. This lower battery level represents a cost of deviating to image the region 506. In some cases, AAV 508 may need to further deviate to a recharging point in order to reach destination 512.

The parameters can also or alternatively include time constraints and/or a priority associated with a current task of the AAV.

Figure 6:
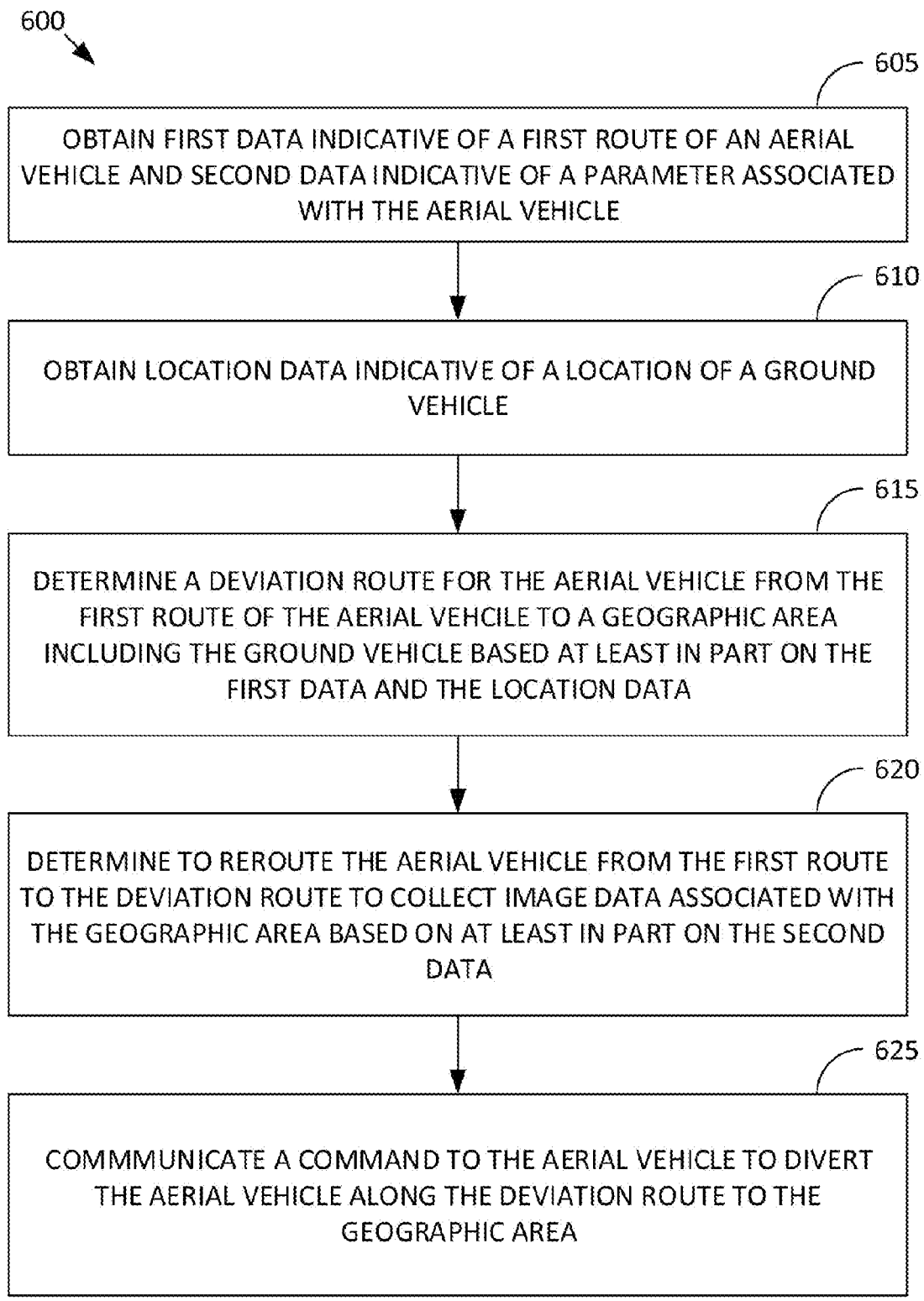
FIG. 6 is a flowchart of an example process for diverting an autonomous vehicle.

FIG. 6 is a flowchart of an example process for diverting an aerial vehicle. In some embodiments, one or more of the functions discussed below with respect to FIG. 6 are performed by hardware processing circuitry. For example, in some embodiments, instructions are stored in an electronic hardware memory that when executed configure the hardware processing circuitry to perform one or more of the functions discussed below with respect to FIG. 6.

In operation 605, first data indicative of a first route (or initial route) of an aerial vehicle is obtained. The aerial vehicle may be an autonomous aerial vehicle in at least some embodiments. The first route may have been assigned to the aerial vehicle for the purposes of transporting a payload. Thus, the first route is an initial route for the aerial vehicle in some embodiments. The payload could be a passenger, such as a human or other animal passenger, or an item, such as dry goods or other product goods. The first route may have been assigned in response to a request from a user. The user may have purchased an item included in the payload and requested that the item be shipped to a location included in the first route.

Operation 605 also obtains second data. Second data is indicative of at least one parameter associated with the aerial vehicle. In some embodiments the at least one parameter includes one or more of a range of the aerial vehicle given an existing charge level or fuel level, a payload capability of the aerial vehicle, a destination location of the first route, or a priority associated with the first route, or a time constraint.

In operation 610, location data, or data indicative of a first location of a ground vehicle is obtained. In some embodiments, the ground vehicle is an autonomous ground vehicle. In some embodiments, the ground vehicle is a light electronic vehicle. In some embodiments, the data indicative of the first location of the ground vehicle may be derived from a positioning sensor on-board the ground vehicle, such as a GPS sensor.

In operation 615, a deviation route of the aerial vehicle is determined. The deviation route is determined based on the first data. In some embodiments, the deviation route is determined such that the aerial vehicle overflies the geographic area including the first location. In some embodiments, operation 615 predicts future locations of the ground vehicle. For example, in some embodiments, process 600 receives route information for the ground vehicle and identifies additional locations of the ground vehicle when traveling along the ground route. In some embodiments, eh deviation route is determined so as to overfly one or more of these additional locations, or at least bring the aerial vehicle into a position such that it can effectively image the additional locations.

In some aspects, process 600 receives an indication that a particular geographic region or a portion of the particular geographic region is occluded and is unable to be imaged by the ground vehicle. For example, in some aspects, one or more sensors on the ground vehicle may be malfunctioning and unable to collect imaging data for the geographic region properly. In some aspects, one or more geographic regions may be obstructed from view by another object. For example, large buildings or topography may prevent imaging of some geographic areas by on board vehicle sensors. Thus, in these embodiments, the deviation route is determined such that the aerial vehicle may image the occulated one or more geographic areas.

The deviation route is further determined based on the first data.

Operation 620 assigns the deviation route to the aerial vehicle. By selecting the deviation route for the aerial vehicle, the aerial vehicle will no longer travels along the first route. Thus, operation 620 reroutes the aerial vehicle. The deviation route is assigned to the aerial vehicle, in at least some embodiments, to collect image data of the first location of the ground vehicle. The assignment of the deviation route is based, at least in part, on the parameter of the aerial vehicle.

Operation 625 communicates one or more commands to the aerial vehicle to divert the aerial vehicle to travel along the deviation route to the geographic area.

Some embodiments of process 600 include receiving image data associated with the geographic area collected by the aerial vehicle. The image data defines one or more images. For example, after the aerial vehicle receives the one or more commands to deviate along the deviation route, the aerial vehicle may capture images of one or more geographic regions and provide those images via a wireless link. Some embodiments communicate the images to a tele-assistance computing system. The tele-assistance computing system is configured to present the image data for display via a user interface.

In some embodiments, the images may be communicated to the ground vehicle. The ground vehicle may make use of the images for navigation or other operation of the ground vehicle.

Figure 11A:
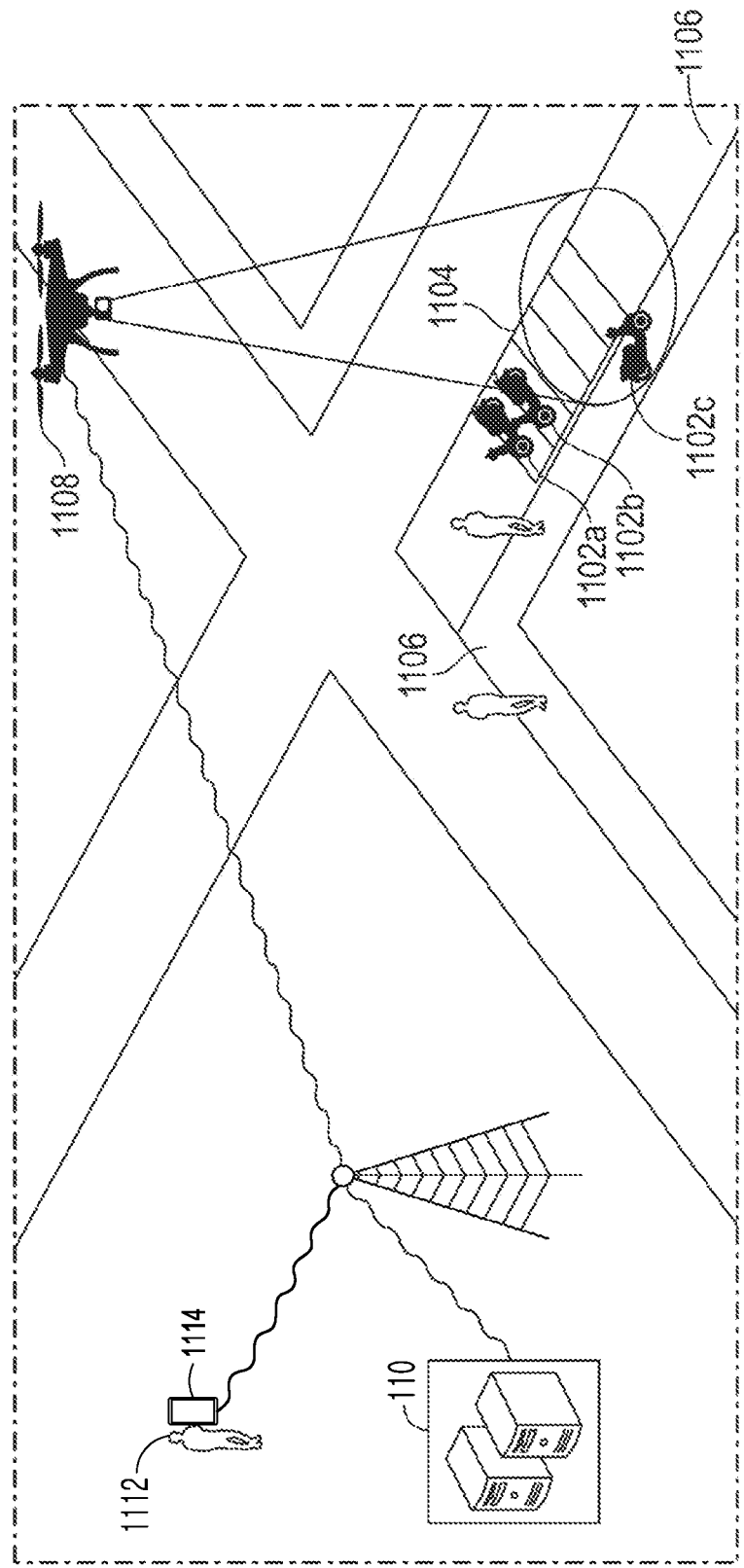
FIG. 11A is a diagram of a scene including scooters imaged by a drone.

In some embodiments, a second location of the ground vehicle is determined based on the received images. The second location may have an improved precision or resolution relative to the first location in some embodiments. In some embodiments, a determination of whether the ground vehicle is positioned within a permitted region or zone is determined based on the second location. As discussed below for example with respect to FIG. 11, light electric vehicle service providers may be responsible for ensuring their vehicles are positioned so as to conform with all applicable laws within a jurisdiction. For example, in some embodiments, scooters and/or bicycles must be positioned to conform with requirements applicable within a particular region or zone (e.g. a sidewalk or a designated staging area for the scooters and/or bicycles). In some embodiments, process 600 utilizes the images collected by the aerial vehicle to verify proper and/or legal positioning of the ground vehicle.

In some embodiments, the image data is stored in a data store. A mobile device may retrieve the image data from a data store. For example, the mobile device is configured to provide vehicle reservation functions. In some of these embodiments, the mobile device is configured to display one or more images derived from the image data within a user interface. The user interface may provide for at least some of the vehicle reservation functions.

Figure 7:
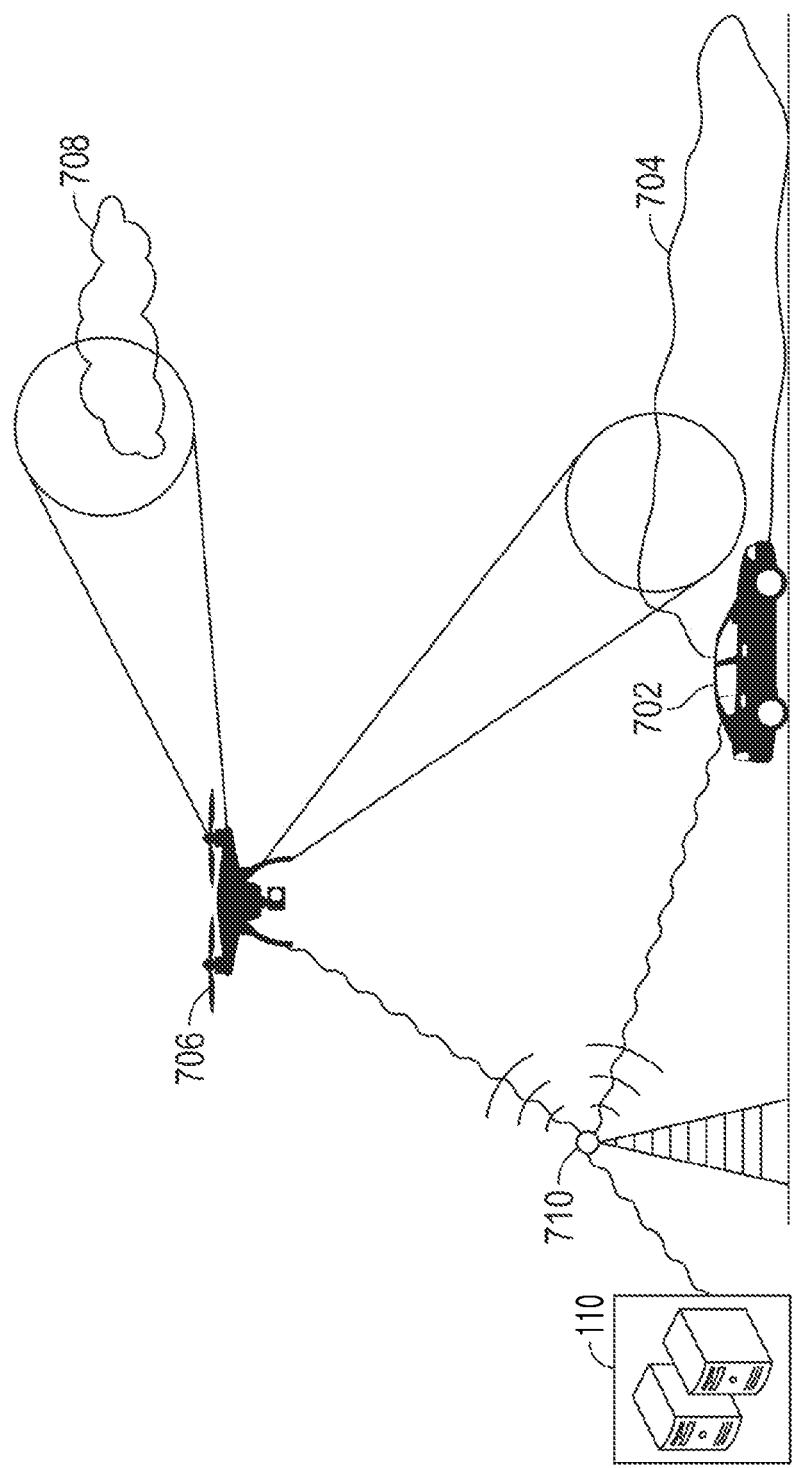
FIG. 7 is a diagram illustrating use of drones to collect weather information.

FIG. 7 is a diagram illustrating use of autonomous vehicles to collect weather information. FIG. 7 shows an AGV 702. The AGV 702 is attempting to navigate a route that is at least partially obscured by fog 704. An aerial vehicle 706 may be tasked to image the fog 704 to obtain information on, for example, a density and/or thickness of the fog 704. In some cases, the imaging provided by the aerial vehicle 706 may include one or more of visual imaging, LIDAR imaging, and or RADAR imaging.

The aerial vehicle 706 may also capture airborne weather data, via passive or active sensors. Weather data such as data relating to cloud coverage, pressure, temperature, dew point, wind direction or other weather data. As shown, the aerial vehicle 706 may image a cloud 708 to obtain information on cloud coverage, cloud height, cloud density, or other parameters. Wind speed and direction information at various altitudes may be determined by comparing a ground track of the aerial vehicle 706 to a course/speed as set by a control system of the aerial vehicle 706. This information may be provided, e.g., via an antenna 710, to the mobility network server(s) 110, which relay the weather information to the AGV 702. Alternatively, the mobility network server(s) 110 may use the weather information when determining routes for autonomous vehicles. For example, regions experiencing severe weather events may be deprioritized relative to other regions with more stable weather when determining routes.

Figure 8:
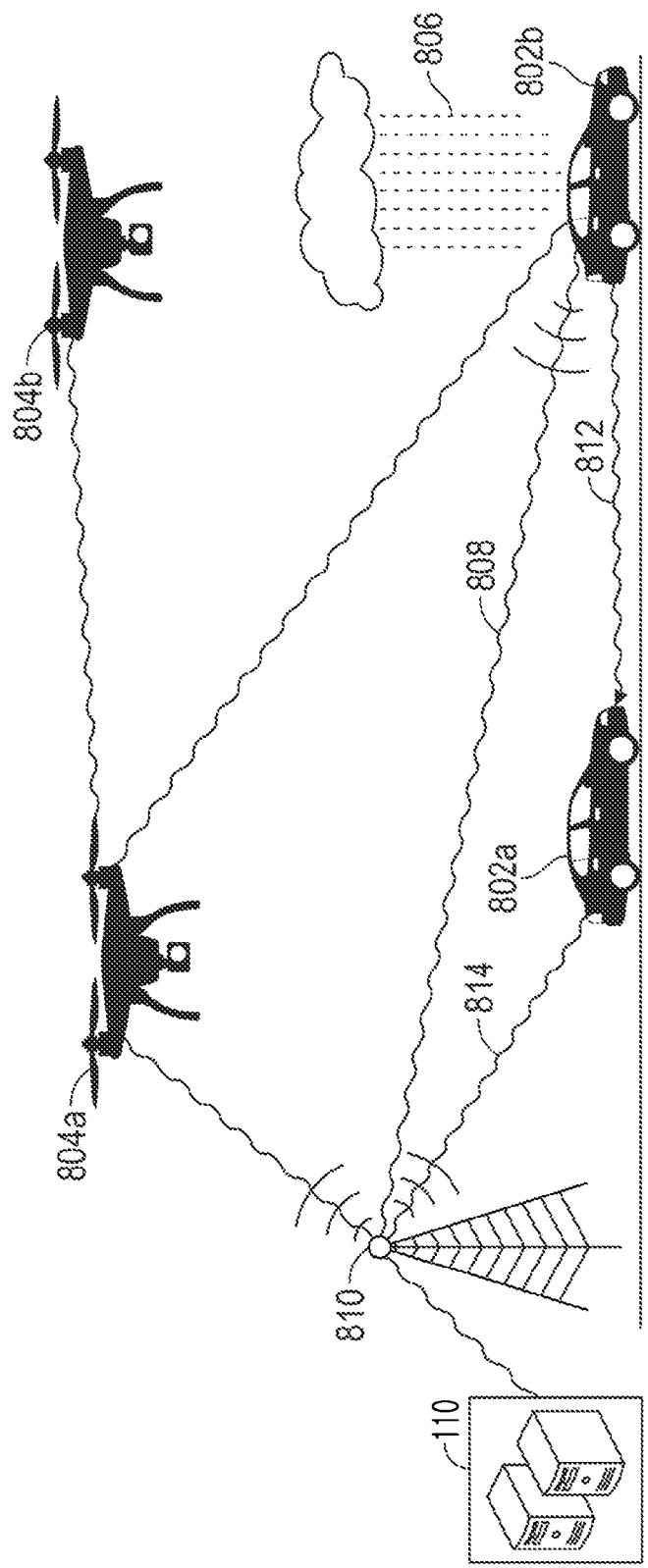
FIG. 8 is a diagram showing use of a drone as a relay.

FIG. 8 is a diagram showing use of an autonomous vehicle as a relay. FIG. 8 shows two AGVs 802a-b. FIG. 8 also shows two AAVs 804a and 804b. The autonomous vehicle 802b is illustrated within a storm area 806, which may be disrupting direct radio communication with the mobility network server(s) 110 via path 808. To maintain connectivity with the mobility network server(s) 110, the autonomous vehicle 102b may switch from the path 808 to antenna 810 to an alternate path 812, which utilizes the autonomous vehicle 802a as a relay device. Upon receiving data from the autonomous vehicle 802b via alternate path 812, the autonomous vehicle 802a relays the data over path 814 to the antenna 810, which then passes the data to the mobility network server(s) 110.

Figure 9:
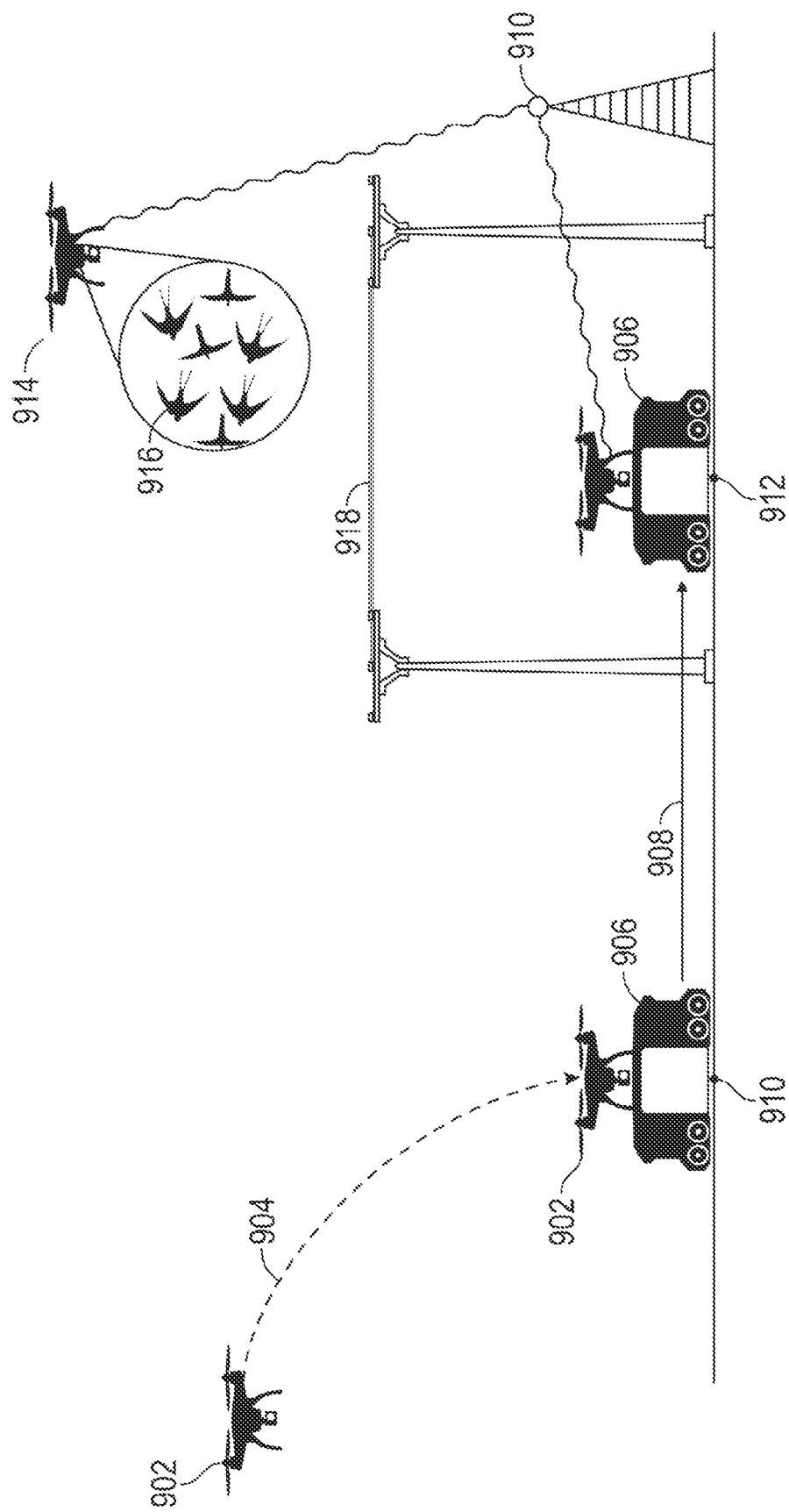
FIG. 9 is a diagram illustrating use of a drone to augment operations of a second drone.

FIG. 9 is a diagram illustrating use of an aerial vehicle to augment operations of a second aerial vehicle. Some transportation services provided by the disclosed embodiments may be multi-modal. In other words, a payload may be transported from an origin location to a destination location via a combination of at least two types of transportation vehicles. For example, an AAV may perform a first portion or leg of a transportation service while a ground AV performs a second portion of the transportation service. In some cases, after the aerial component is complete, the tasking may define a transfer of a payload from the aerial vehicle to an AGV for completion of the ground-based component. In other cases, the ground-based component is completed by the AAV first landing on an AGV. No payload transfer is performed. Instead, the ground vehicle travels the ground component of the route with the aerial vehicle attached.

FIG. 9 shows an example of such a tasking, with an AAV 902 performing a first aerial component 904, and an AGV 906 carrying the aerial vehicle 902 along a second ground-based component 908. In the illustrated embodiment, the AAV 902 lands on the AGV 906, at a first position 910. The AGV 906 then transports the AAV 902 from the first position 910 to a second location 912. The second location 912 may be a location where a payload of the AAV 902 (not shown) can be offloaded more safely and efficiently than at the first position 910.

After the payload is offloaded at the second location 912, the AAV 902 may seek to lift off of the ground AGV 906. A second AAV 914 may be tasked to image the aerial environment around the AAV 902 at the second location 912. This imaging may detect one or more hazards to operation of the AAV 902 at the second location 912. For example, the imaging may detect hazards above the AAV 902, such as a flock of birds 916 and/or wires 918 which could represent hazards to operation of the aerial AGV 906.

This information is then provided to the mobility network server(s) 110. The mobility network server(s) 110 may then provide the information to the AAV 902. Alternatively, the mobility network server(s) 110 may generate a route for the AAV 902 to avoid hazards such as the flock of birds 916 and/or the wires 918.

While FIG. 9 shows the second AAV 914 capturing imagery to assist a second AAV 902, in some aspects, a first AV (such as the AAV 902) may be tasked to capture imagery that is provided to a tele-assistance computing system (e.g. the mobility network server(s) 110 in some embodiments, or a separate computing system in some other embodiments). Once the imaging data is available at the tele-assistance computing system, it is made available (e.g. displayed via an electronic display) to a tele-assistance operator, for example, via a console. The tele-assistance operator may assist the first AAV 902 remotely via a wireless connection based on the displayed imaging data. Assisting the first AAV 902 may include providing control inputs that control movement of the first AAV 902. The tele-assistance operator may be provided with imagery, via the tele-assistance computing system, from one or more cameras on-board the first AAV 902. However, visibility from a perspective of the first AAV 902 may be limited in some environments. Thus, the tele-assistance operator may request, via the tele-assistance computing system, additional imagery from a second AAV (e.g. the second AAV 914) to provide improved contextual awareness when assisting the first AAV 902. In response to the request from the tele-operator, the mobility network server(s) 110 may task an AAV (e.g. the second AAV 914) with imaging a location proximate to the first AAV 902. The mobility network server(s) 110 may obtain the imagery from the second AAV (e.g. the second AAV 914) and provide it, via the tele-assistance computing system to a display/console of the tele-assistance operator. This may assist with, for example, providing visibility to the tele-assistance operator around occlusions, such as buildings, corners, trees, other vehicles, and the like. This may allow the tele-assistance operator to provide further control inputs to the first AAV 902 to assist the first AAV 902 with navigating obstructions or other dangerous conditions.

Figure 10:
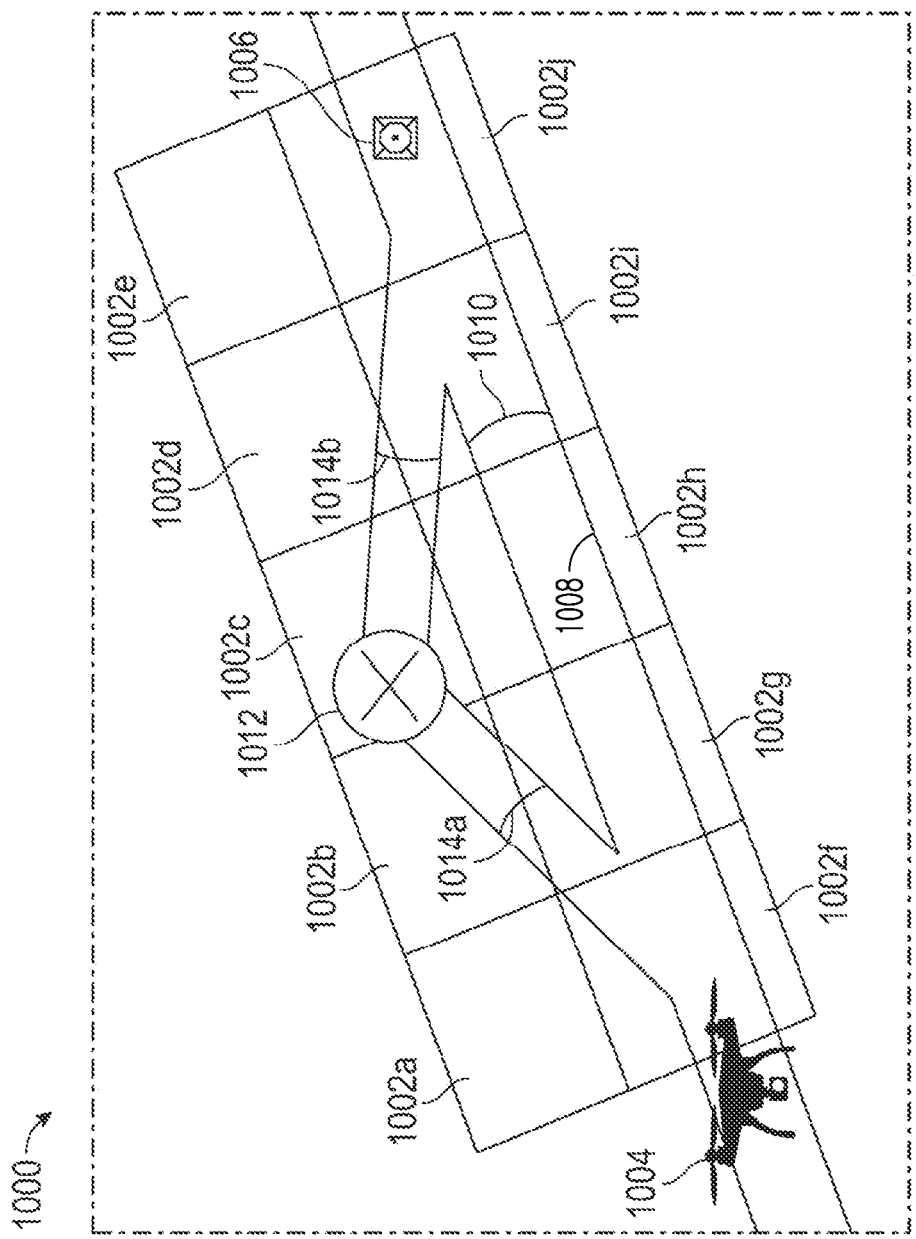
FIG. 10 is a diagram showing collection of opportunistic data and tasked data by a drone.

FIG. 10 is a diagram showing collection of opportunistic data and tasked data by an aerial vehicle. FIG. 10 shows a map 1000 including a plurality of regions, a subset of which are labeled as regions 1002a-j. An AAV 1004 is tasked with delivering a payload to a destination 1006 via a route 1008. The task of delivering the payload is in response to a user request for an item included in the payload in some embodiments. For example, the user may purchase the item via an electronic commerce transaction, and request delivery of the item to an address, such as their home or business address. If the AAV 1004 travels the route 1010, the AAV 1004 may capture imaging information along the route 1008 that includes a region shown as 1010. The region 1010 bifurcates each of the regions 1002f-j.

Whether opportunistic imaging of the region 1010 has value to the mobility network server(s) 110 may vary based on a number of conditions. As discussed above, each of the regions 1002a-j has one or more of a recency score, stability score, and relevancy score. One or more of these scores are used to compute an uncertainty score for each region. A value associated with collecting data from the region 1010 may be determined based on the uncertainty scores and/or one or more of the recency score, stability score, and relevancy score.

The mobility network server(s) 110 also have identified the region 1002c as having a relatively high uncertainty score. In particular, a sub-region 1012 of the region 1002c has a high uncertainty score. Thus, the mobility network server(s) 110 determines a priority between maintaining the route 1008 of the AAV 1004, which opportunistically images the region 1010, or re-tasking the AAV 1004 to image the region 1012. Note that by re-tasking the AAV 1004 to image the region 1010, a new opportunistic imaging region also presents itself, identified in FIG. 10 as region along a new route, shown as 1014a and 1014b.

Based on benefits associated with imaging each of the regions 1010 and 1014a and 1014b, the mobility network server(s) 110 determines whether to re-task the AAV 1004 to deviate from the original route 1008 to destination 1006 to the alternate route which opportunistically images regions 1014*a-b* and the region 1012. To make this determination, other costs associated with rerouting the AAV 1004 are considered.

FIG. 11 is a diagram of a scene including scooters imaged by an aerial autonomous vehicle. Electric scooters are increasing in popularity, especially in urban environments. Many of these scooters are equipped with GPS devices and wireless transmitters. Each scooter may be configured to report its current position to a scooter management enterprise, which may periodically collect scooters from various locations, perform necessary maintenance, recharging, and/or cleaning, and reposition the scooters for further use. While the on-board GPS positioning systems of these scooters function well for this purpose, they are generally not accurate enough to identify when certain exception conditions occur. For example, as illustrated in the discussion of FIG. 11 below, even if a scooter is within a few feet of a scooter drop off location, its position may be problematic, and require attention by the scooter management enterprise.

As shown, scooters 1102*a-c* are positioned near a scooter drop off area 1104. Two of the scooters, scooter 1102*a* and scooter 1102*b*, are properly positioned within the drop off area. A third scooter 1102*c* is proximate to the drop off area 1104 but is positioned so as to partially block access to a sidewalk 1106. GPS positioning data provided by the scooter 1102*c* may not have accuracy sufficient to distinguish from the properly positioned scooters 1102*a-b* and the scooter 1102*c* which is improperly positioned. Thus, the scooter management enterprise responsible for the scooter 1102*c* is unaware of the exceptional condition illustrated in FIG. 11. Additionally, at least in some jurisdictions, the scooter management company may be subject to fines or other forms of renumeration if the condition remains uncorrected for more than a relatively brief period of time.

An AAV 1108 is tasked to image the scooter drop off area 1104. An image is captured by the AAV 1108 and transmitted wirelessly to the mobility network server(s) 110, for example, via antenna 1110. Imaging processing methods performed by the mobility network server(s) 110 are configured to detect that the scooter 1102*c* is blocking the sidewalk 1106. In response, the mobility network server(s) 110 are configured to dispatch a scooter maintenance technician to organize the scooters properly. The AAV 1108 may also count the number of scooters proximate to the drop off area 1104. The count may be used to determine an amount of scooters to add or subtract from the drop off area 1104 and to move to/from other drop off areas (not shown) or other scooter locations.

In some aspects, imagery acquired by the AAV 1108 of one or more of the scooters 1102*a-c* may be provided to the mobility network server(s) 110 via an antennas 1110 and/or to an end user 1112 via a mobile device 1114. The mobile device 1114 executes, in some embodiments, a mobile application configured to provide rental services for the scooters 1102*a-c*. The mobile application may display the imagery to a user under appropriate circumstances.

Figure 11B:
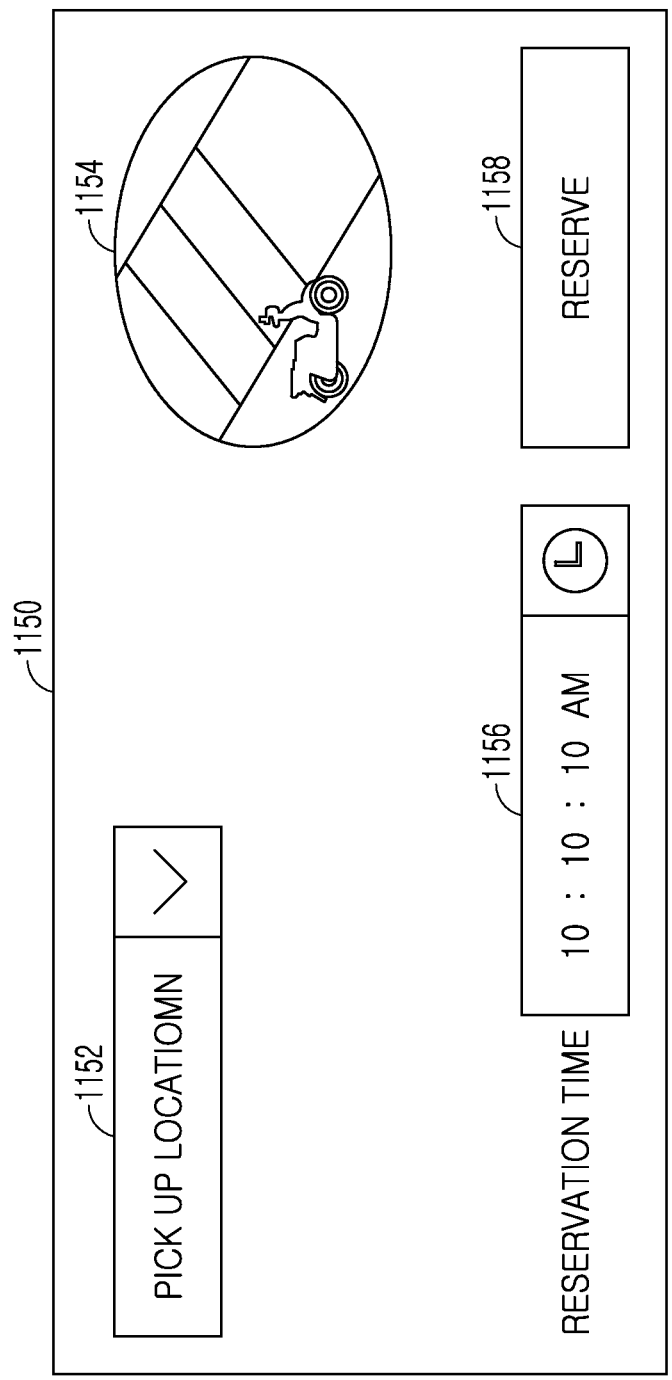
FIG. 11B shows an example user interface displayed on a mobile device.

FIG. 11B shows an example user interface displayed on a mobile device. In some embodiments, the user interface 1150 of FIG. 11B is displayed on the mobile device 1114, discussed above with respect to FIG. 11A. The example user interface 1150 shows a selection control 1152 that is configured to allow selection of a pick up location for a light electric vehicle, such as a scooter. In some embodiments, upon selection of a particular pick-up location or staging area of light electric vehicles via selection control 1152, the user interface 1150 displays a most recent aerial image 1154 of the selected pick-up location or staging area. For example, as discussed above with respect to FIG. 11A, in some embodiments, the AAV 1108 images the scooter staging/pick-up/drop off area 1104 shown in FIG. 11A and transmits one or more resulting images via antenna 1110 to the mobility network server(s) 110. The mobility network server(s) 110 then, upon request from the mobile device 1114, provide one or more of the images, which are then displayed, in some embodiments, as image 1154 via the user interface 1150 of FIG. 11B. In some circumstances, the image is a real-time image. For example, if the end user 1112 is attempting to reserve a light electric vehicle at a time when the AAV 1108 can image the staging/pick-up/drop off area 1104, the most recent image is a real-time image, or an image that has been captured within a relatively short time period of when it is displayed. For example, a delay between capture of the image and the AAV 1108 an display on the mobile device 1114 in some embodiments, is less than 1 second, 2 second, 5 seconds, 6, seconds, 7, seconds, or 10 seconds.

If the end user 1112 wishes to reserve a light electric vehicle, they can select a date/time via the time/date control 1156, and then select a reserve control 1158.

FIG. 12 shows example data structures, one or more of which may be implemented in one or more of the disclosed embodiments. While the data structures illustrated in FIG. 12 are disclosed below as relational database tables, one of skill would understand that various embodiments may implement these data structures using other data storage architectures. For example, these data structures may be implemented as unstructured data, or as traditional memory based data structures such as arrays, linked lists, trees, or utilize any other data storage architecture.

FIG. 12 shows an AV table 1220, AV route table 1230, a route table 1240, a segment table 1250, and a region table 1260. The AV table 1220 includes an AV identifier field 1222, an AV type field 1223, last location field 1224, last location update time field 1226, and orientation field 1228, The AV identifier field 1222 uniquely identifies a particular AV, and may be cross referenced with other AV ID fields discussed below. The AV type field 1223 identifies whether the AV is a AAV, AGV, Scooter, or other type of AV. The last location field 1224 indicates a location of the AV as indicated by a previous location update received from the AV. The last location update time field 1226 indicates a time of the last location update. The orientation field 1228 indicates an orientation of the AV. The orientation field 1228 may indicate whether an AV is in an orientation compatible with recharging and/or service.

The AV route table 1230 includes an AV id field 1232, route ID field 1234, origin field 1236, destination field 1237, payload field 1238, and an estimated time of arrival (ETA) field 1239. The AV id field 1232 uniquely identifies an AV. The route ID field 1234 uniquely identifies a route assigned to an AV identified by the AV id field 1232. The origin field 1236 identifies an origin location for the route. The destination field 1237 identifies a destination location for the route. A payload field 1238 includes data defining a payload carried by the AV (e.g. 1223) on the route (e.g. identified via route ID field 1234). The ETA field 1239 indicates an estimated time of arrival at the destination (e.g. 1237).

The route table 1240 includes a route identifier field 1242, segment identifier field 1244, and an order field 1246. The route identifier field 1242 uniquely identifies a particular route. The route identifier field 1242 may be cross referenced with the route ID field 1234. The segment identifier field 1244 uniquely identifies a portion of the route. For example, the segment identifier may define vector data defining a portion of a road and a direction on the road. The order field 1246 indicates where in the route (e.g. 1242), the segment (e.g. identified via the segment identifier field (1244)) is located with respect to other segments.

The segment table 1250 includes a segment identifier field 1252, a region identifier field 1254, and a segment data field 1256. The segment identifier field 1252 uniquely identifies a particular segment, and may be cross referenced with the segment identifier field 1244 discussed above. The region identifier field 1254 uniquely identifies a region in the region table 1260, discussed below. The segment data field 1256 defines the segment identified by segment identifier 1252. For example, the segment data field 1256 may define vector information defining geographic location boundaries of the segment, and/or other segment characteristics.

The region table 1260 includes a region identifier field 1261, a last update time field 1262, a visit count field 1263, a stability score field 1265, a recency score field 1266, a relevancy score field 1267, and a region data field 1268. The region identifier field 1261 uniquely identifies a region, and may be cross referenced with the region identifier field 1254 discussed above. The last update time field 1262 indicates a time when data defining the region was last updated. Data defining the region may include one or more features of the region, such as stop lights, parked cars, hazards such as accidents, traffic conditions, or other conditions. The visit count field 1263 indicates a number of AV's passing through the region during a previous period of time. The visit count field 1263 may be used, in some embodiments, to determine a relevancy of the region, with regions experiencing a larger number of visits being more relevant than regions experiencing fewer visits.

The uncertainty score field 1264 defines an uncertainty score for the region identified by region id 1261. The uncertainty score field 1264 defines a relative measure of uncertainty that data in the region (e.g. 1261) reflects a "current" state of the region. The uncertainty score may be based, for example, on a value included in the last update time field 1262. Furthermore, the uncertainty score field 1264 is based on the stability score field 1265. In some aspects, the uncertainty score is based on the recency score field 1266, discussed in more detail below. In some aspects, the uncertainty score field 1264 is also based on the relevancy score 1267.

The stability score field 1265 indicates a stability score for the region. In some aspects, the stability score may be manually configured for each region. Alternatively, at least some stability scores for some regions may be dynamically determined. For example, in some aspects, changes to a particular region may be monitored when new data is available for a region. An amount of change to the region over time may be used to determine the stability score, with regions having a larger amount of change over a predetermined time period receiving a stability score lower than other regions having less change over the predetermined time period.

The recency score field 1267 may reflect how relatively recently data for the region has been updated relative to other regions. In some aspects, updates to regions may be partial. For example, traffic information for one road within a region may be updated while traffic information for other road segments within the region are not updated. Thus, the recency score may provide a more fine-grained indication of recency when compared to the last update time field 1262. For example, some embodiments determine a recency score based on a percentage of road segments within the region that have been updated with a predetermined time period.

The relevancy score 1267 indicates a relevancy of the region. Some embodiments may consider the relevancy score when prioritizing which regions to image. The relevancy score 1267 may be based, in part, on the visit count field 1263. For example, urban, more frequented regions are more relevant than back country regions with few visitors, at least in some embodiments. In some aspects, the relevancy score may be based on a size of the region. The size may be represented as geographic size, or numerosity of road segments or road lanes included in the region. For example, in some aspects, the relevancy score is based on the visit count field 1263 prorated by the numerosity of road segments in the region.

Some embodiments may predict visits to particular regions based on planned routes of travel of one or more AVs. These predicted visits may also be used to recalculate relevancy scores. By predicting visits to regions, the disclosed embodiments may be able to provide relatively current data on region characteristics before an AV arrives in the region.

The region data field 1268 stores data defining characteristics of the region. For example, the region data field 1268 may define geographic boundaries of the region. The region data field 1268 may further define one or more characteristics of the region, based on a last update (as indicated by the last update time field 1262).

Figure 13:
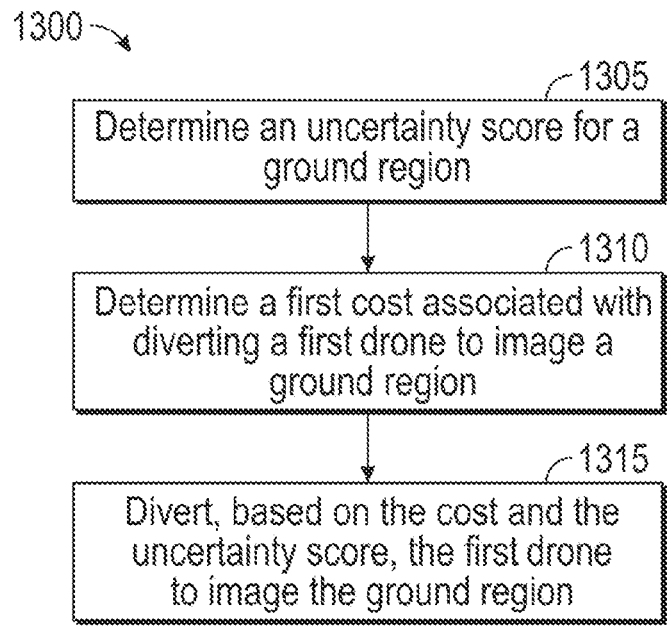
FIG. 13 is a flowchart of a process for diverting a drone to image a ground region.

FIG. 13 is a flowchart of a process for diverting an aerial autonomous vehicle to image a ground region. In some aspects, one or more of the functions discussed below with respect to FIG. 13 and process 1300 may be performed by hardware processing circuitry. For example, an electronic hardware memory (e.g. 1604 and/or 1606) may store instructions that configure hardware processing circuitry (e.g. 1602 below) to perform one or more of the functions discussed below. For notational convenience, a device executing the process 1300 may be refereed to below as an "executing device."

Operation 1305 determines an uncertainty score (e.g. as stored in the uncertainty score field 1264) for a ground region. For example, as discussed above with respect to FIG. 4, and/or FIG. 12, a region may be characterized by one or more of a stability score (e.g. field 1265), relevancy score (e.g. via field 1267), and recency score (e.g. via recency score field 1266). The uncertainty score (e.g. stored in the uncertainty score field 1264) may be based on one or more of these scores. In some aspects, a weighted average of the stability score, relevancy score, and recency score may be used to determine the uncertainty score. Some embodiments may periodically recalculate one or more of these scores.

In some aspects, a determination is made that an AGV is scheduled to traverse, be proximate to (within a predetermined distance of) or is already located in, the ground region. For example, as discussed above with respect to FIG. 3, the autonomous vehicle 302 is within the scene, and a region proximate to the autonomous vehicle is imaged by the AAV 315. In some aspects, a relevancy score of the ground region may be based on the determination that the AGV is scheduled to be proximate to the ground region. In some aspects, the relevancy score may be further based on a number of vehicles that will be proximate to the region within a time period. In other words, busier regions may have higher relevancy scores than regions with fewer visits by vehicles.

In some aspects, as discussed above with respect to FIG. 11, a determination may be made that one or more scooters is located in a particular region. For example, a scooter may be located proximate to a scooter drop off location (e.g.

1104). The disclosed embodiments may seek to identify an AAV that can image the scooter location to verify the scooter is properly positioned at the scooter drop off location (e.g. 1104) or at least not presenting a public hazard (such as blocking the sidewalk 1106 as shown in FIG. 11 by scooter 1102c). Thus, for example, a relevancy score for a region may be based, at least in part, on a number of scooters positioned within the region which have not been imaged in their present location.

Operation 1310 determines a first cost associated with diverting or tasking a first aerial autonomous vehicle to image a ground region. As discussed above with respect to FIG. 5-6, a cost of diverting an AAV can include an additional distance that may be required for the AAV to traverse in order to capture images of the ground region. Additionally, diverting the AAV may delay delivery of a payload Operation 1315 diverts the first AAV to image the ground region based on the cost and uncertainty score. In some aspects, operation 1315 may determine multiple costs for multiple diversions of multiple corresponding AAV's. An AAV having the lowest cost to divert may then be tasked with imaging the ground region. Alternatively, if the lowest cost of diversion is higher than a benefit of obtaining an image of the ground region (e.g. based on the region's uncertainty score and/or recency score), then no diversion may be performed and instead an autonomous vehicle may be navigated through the region based on existing data for the region, without a benefit of additional data gathered by an AAV.

To determine the first cost, a first route of the AAV between an origin location and a destination location may be determined. A second route may be determined between a divert location and the destination location. For example, the AAV may have already left the origin location and thus a divert location along the route may be determined. The divert location may take into account a recent location of the AAV and an additional distance along the first route to provide a delay for determining the divert and communicating instructions to the AAV to divert.

A set of regions between the divert location and the destination location may be determined. Additionally, a third route between the divert location and the ground region is determined. A fourth route between the ground region and the destination location is determined.

The third route and fourth route describe a path the AAV will take if it is diverted to image the ground region. In other words, the AAV would deviate at the divert point and travel to the ground region, capture one or more images of the ground region, and then continue on to the original destination location. Thus, while diverting to image the ground region, the AAV has an opportunity to "opportunistically" image other regions it over flies on its way to the ground region, and then again along the route from the ground region to the original destination location. This opportunistic imaging also provides some benefit, and the benefit of this opportunistic imaging is considered when determining a cost of the diversion. Some embodiments may calculate multiple routes from the divert point (and/or multiple divert points) to the ground region, and then multiple routes from the ground region to the final destination. Uncertainty scores for each of these potentially overflown regions are determined. As discussed above, each of the uncertainty scores may be determined based on one or more of a recency score, stability score, and relevancy score of the respective region. Costs for diverting the AAV using these various routes may then be determined As one example, if multiple ground regions along one possible route from the divert point to the ground region have low uncertainty, a route that allows over flight (and image capture) of those lower certainty ground regions may be preferred over a more direct route with less opportunity to overfly low certainty ground regions.

The process 1300 may receive an image of the ground region. In some aspects, the image may be received from the AAV. Alternatively, the AAV may download the image to another device, which stores the image in an image database. An executing device may then retrieve the image from the database. Data derived from the image may then be provided to the ground-based autonomous vehicle. Alternatively, the data could be provided to a manually driven vehicle, for example, in the form of a traffic update to the manually operated vehicle.

Figure 14:
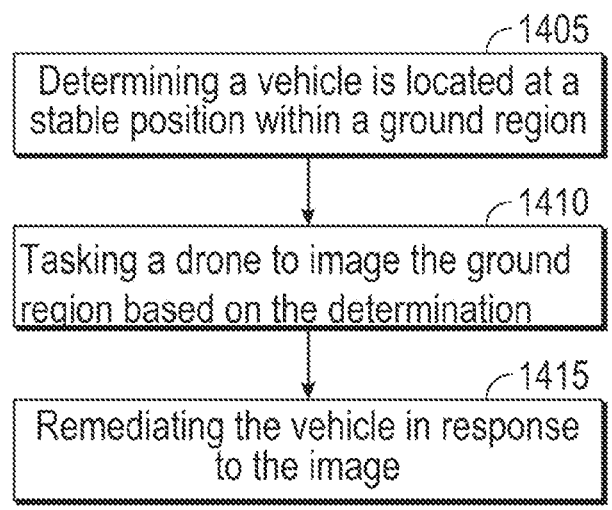
FIG. 14 is a flowchart of a process for diverting a drone to image a ground region.

FIG. 14 is a flowchart of a process for diverting an aerial autonomous vehicle to image a ground region. In some aspects, one or more of the functions discussed below with respect to FIG. 14 and process 1400 may be performed by hardware processing circuitry. For example, an electronic hardware memory (e.g. 1604 and/or 1606) may store instructions that configure hardware processing circuitry (e.g. 1602 below) to perform one or more of the functions discussed below. For notational convenience, a device executing the process 1400 may be referred to below as an "executing device."

In operation 1405, a determination is made that a vehicle is located at a stable position within a ground region. In some aspects, the vehicle may be an autonomous vehicle, such as an autonomous car. Alternatively, the vehicle may be an electric scooter. The stability of the position may be determined based on a threshold period of time that the position of the vehicle does not change. For example, if a vehicle stays in a particular position for more than ten (10) minutes, it may be considered to be in a stable position in some aspects. In some aspects, operation 1405 may further determine whether the stable position is within a threshold distance of another predetermined position. For example, a vehicle service entity may designate certain locations for vehicle drop off. As illustrated in FIG. 11 above, a scooter drop off location may provide a parking area for electric scooters. Operation 1405 may determine if the stable position is within a proximity (within a threshold distance) of one of these predetermined locations.

In some aspects, an elapsed time at a stable location may be determined for one or more vehicles within the region. Thus, if a vehicle has only been located at a particular location for a relatively short period of time, it may be less important to capture an image of the vehicle at the location. In some aspects, capture of an image of the location may be delayed in an effort to capture additional vehicles that may arrive after some period of time.

In some aspects, operation 1405 determines a number of vehicles located at stable positions within the ground region. In some aspects, the positions of the vehicles may be determined via information received from the vehicles themselves. For example, the vehicles may be equipped with GPS receiver equipment, and be configured to determine their own location within a threshold level of accuracy. This location information may be transmitted over a wireless connection by the vehicles to an information system. Process 1400 may analyze this location information to determine a number of vehicles located within the ground region.

In operation 1410, an AAV is tasked with capturing an image of the position based on the determining. In some aspects, the tasking is based on how close the vehicle is to a predetermined location (e.g. drop off location) as discussed above. In some aspects, the tasking is based on a number of vehicles within the region or within a proximity of each other. For example, if several (above a threshold) vehicles are clustered together such that information on the several vehicles may be obtained via a single or relatively few (below a threshold) images, a priority of the tasking may be increased relative to a tasking that requires deviation of an AAV to capture information on a single vehicle for example.

In some aspects, the stable position is compared to map information to determine a distance of the vehicle from a right of way. A right of way may include an intersection, sidewalk, street, bike path, rail trail, or other vehicular or pedestrian right of way.

In operation 1415, the vehicle is remediated in response to the image. In some aspects, the image is analyzed to determine one or more characteristics of the vehicle. For example, if the vehicle is a scooter, the image is analyzed to determine if the vehicle is positioned upright or is laying on its side. The image may be analyzed to determine if the vehicle is partially or fully blocking a right of way. In some aspects the image is analyzed to count a number of vehicles (or vehicles of a particular type—such as vehicles owned by a vehicle provider) within the region or within a predetermined distance of the stable location.

If the number of vehicles meet a criterion, remediation of the vehicles may be needed. For example, the vehicles may be used to transport passengers from and to various locations. This use of the vehicles may have one or more asymmetries, which may result in a sub-optimal placement of vehicles as a whole. In other words, some locations may have too few vehicles while other locations have too many vehicles. Thus, it may become necessary to reallocate some of the vehicles to different locations in order to better serve demand for vehicles expected in the future. Thus, if a determination is made that the vehicles should be reallocated or redistributed, the disclosed embodiments may generate a request for vehicle relocation. This request may be transmitted to a maintenance vehicle which is configured to autonomously relocate vehicles, or alternatively, the request may be provided to a human operated vehicle that will rely on a human to assist with the reallocation.

Figure 15:
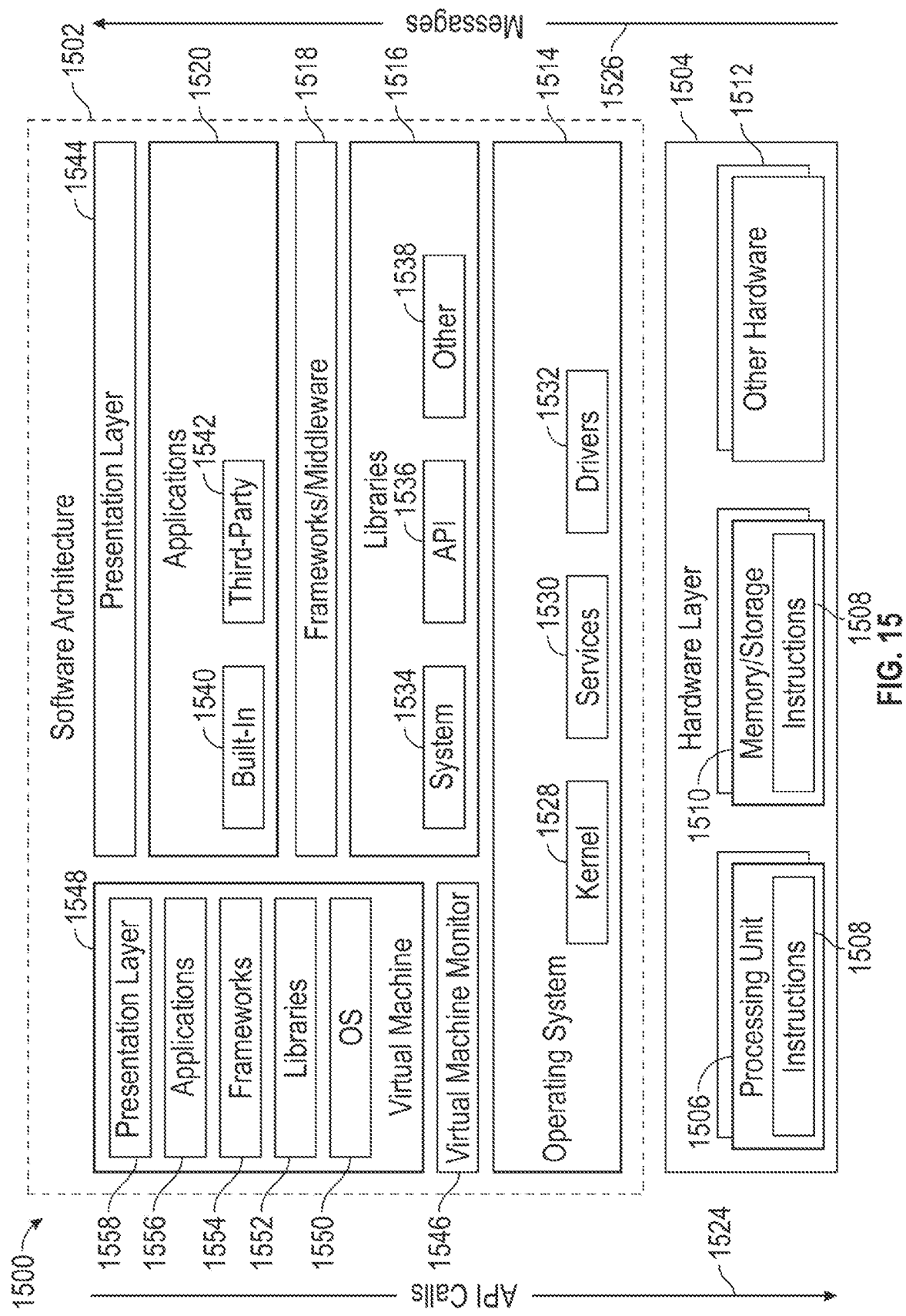
FIG. 15 is a block diagram showing one example of a software architecture for a computing device.

FIG. 15 is a block diagram 1500 showing one example of a software architecture 1502 for a computing device. The software architecture 1502 may be used in conjunction with various hardware architectures, for example, as described herein. FIG. 15 is merely a non-limiting example of a software architecture 1502 and many other architectures may be implemented to facilitate the functionality described herein. A representative hardware layer 1504 is illustrated and can represent, for example, any of the above-referenced computing devices. In some examples, the hardware layer 1504 may be implemented according to an architecture 1600 of FIG. 16 and/or the software architecture 1502 of FIG. 15.

The representative hardware layer 1504 comprises one or more processing units 1506 having associated executable instructions 1508. The executable instructions 1508 represent the executable instructions of the software architecture 1502, including implementation of the methods, modules, components, and so forth of FIGS. 1-13. The hardware layer 1504 also includes memory and/or storage modules 1510, which also have the executable instructions 1508. The hardware layer 1504 may also comprise other hardware 1512, which represents any other hardware of the hardware layer 1504, such as the other hardware illustrated as part of the architecture 1502.

In the example architecture of FIG. 15, the software architecture 1502 may be conceptualized as a stack of layers where each layer provides particular functionality. For example, the software architecture 1502 may include layers such as an operating system 1514, libraries 1516, frameworks/middleware 1518, applications 1520, and a presentation layer 1544. Operationally, the applications 1520 and/or other components within the layers may invoke API calls 1524 through the software stack and receive a response, returned values, and so forth illustrated as messages 1526 in response to the API calls 1524. The layers illustrated are representative in nature and not all software architectures have all layers. For example, some mobile or special-purpose operating systems may not provide a frameworks/middleware 1518 layer, while others may provide such a layer. Other software architectures may include additional or different layers.

The operating system 1514 may manage hardware resources and provide common services. The operating system 1514 may include, for example, a kernel 1528, services 1530, and drivers 1532. The kernel 1528 may act as an abstraction layer between the hardware and the other software layers. For example, the kernel 1528 may be responsible for memory management, processor management (e.g., scheduling), component management, networking, security settings, and so on. The services 1530 may provide other common services for the other software layers. In some examples, the services 1530 include an interrupt service. The interrupt service may detect the receipt of a hardware or software interrupt and, in response, cause the software architecture 1502 to pause its current processing and execute an ISR when an interrupt is received. The ISR may generate an alert.

The drivers 1532 may be responsible for controlling or interfacing with the underlying hardware. For instance, the drivers 1532 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1516 may provide a common infrastructure that may be used by the applications 1520 and/or other components and/or layers. The libraries 1516 typically provide functionality that allows other software modules to perform tasks in an easier fashion than by interfacing directly with the underlying operating system 1514 functionality (e.g., kernel 1528, services 1530, and/or drivers 1532). The libraries 1516 may include system libraries 1534 (e.g., C standard library) that may provide functions such as memory allocation functions, string manipulation functions, mathematic functions, and the like. In addition, the libraries 1516 may include API libraries 1536 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1516 may also include a wide variety of other libraries 1538 to provide many other APIs to the applications 1520 and other software components/modules.

The frameworks/middleware 1518 may provide a higher-level common infrastructure that may be used by the applications 1520 and/or other software components/modules. For example, the frameworks/middleware 1518 may provide various graphical user interface (GUI) functions, high-level resource management, high-level location services, and so forth. The frameworks/middleware 1518 may provide a broad spectrum of other APIs that may be used by the applications 1520 and/or other software components/modules, some of which may be specific to a particular operating system or platform.

The applications 1520 include built-in applications 1540 and/or third-party applications 1542. Examples of representative built-in applications 1540 may include, but are not limited to, a contacts application, a browser application, a book reader application, a location application, a media application, a messaging application, and/or a game application. The third-party applications 1542 may include any of the built-in applications 1540 as well as a broad assortment of other applications. In a specific example, the third-party application 1542 (e.g., an application developed using the Android™ or iOS™ software development kit (SDK) by an entity other than the vendor of the particular platform) may be mobile software running on a mobile operating system such as iOS™, Android™, Windows® Phone, or other computing device operating systems. In this example, the third-party application 1542 may invoke the API calls 1524 provided by the mobile operating system such as the operating system 1514 to facilitate functionality described herein.

The applications 1520 may use built-in operating system functions (e.g., kernel 1528, services 1530, and/or drivers 1532), libraries (e.g., system libraries 1534, API libraries 1536, and other libraries 1538), or frameworks/middleware 1518 to create user interfaces to interact with users of the system. Alternatively, or additionally, in some systems, interactions with a user may occur through a presentation layer, such as the presentation layer 1544. In these systems, the application/module "logic" can be separated from the aspects of the application/module that interact with a user.

Some software architectures use virtual machines. For example, systems described herein may be executed using one or more virtual machines executed at one or more server computing machines. In the example of FIG. 15, this is illustrated by a virtual machine 1548. A virtual machine creates a software environment where applications/modules can execute as if they were executing on a hardware computing device. The virtual machine 1548 is hosted by a host operating system (e.g., the operating system 1514) and typically, although not always, has a virtual machine monitor 1546, which manages the operation of the virtual machine 1548 as well as the interface with the host operating system (e.g., the operating system 1514). A software architecture executes within the virtual machine 1548, such as an operating system 1550, libraries 1552, frameworks/middleware 1554, applications 1556, and/or a presentation layer 1558. These layers of software architecture executing within the virtual machine 1548 can be the same as corresponding layers previously described or may be different.

Figure 16:
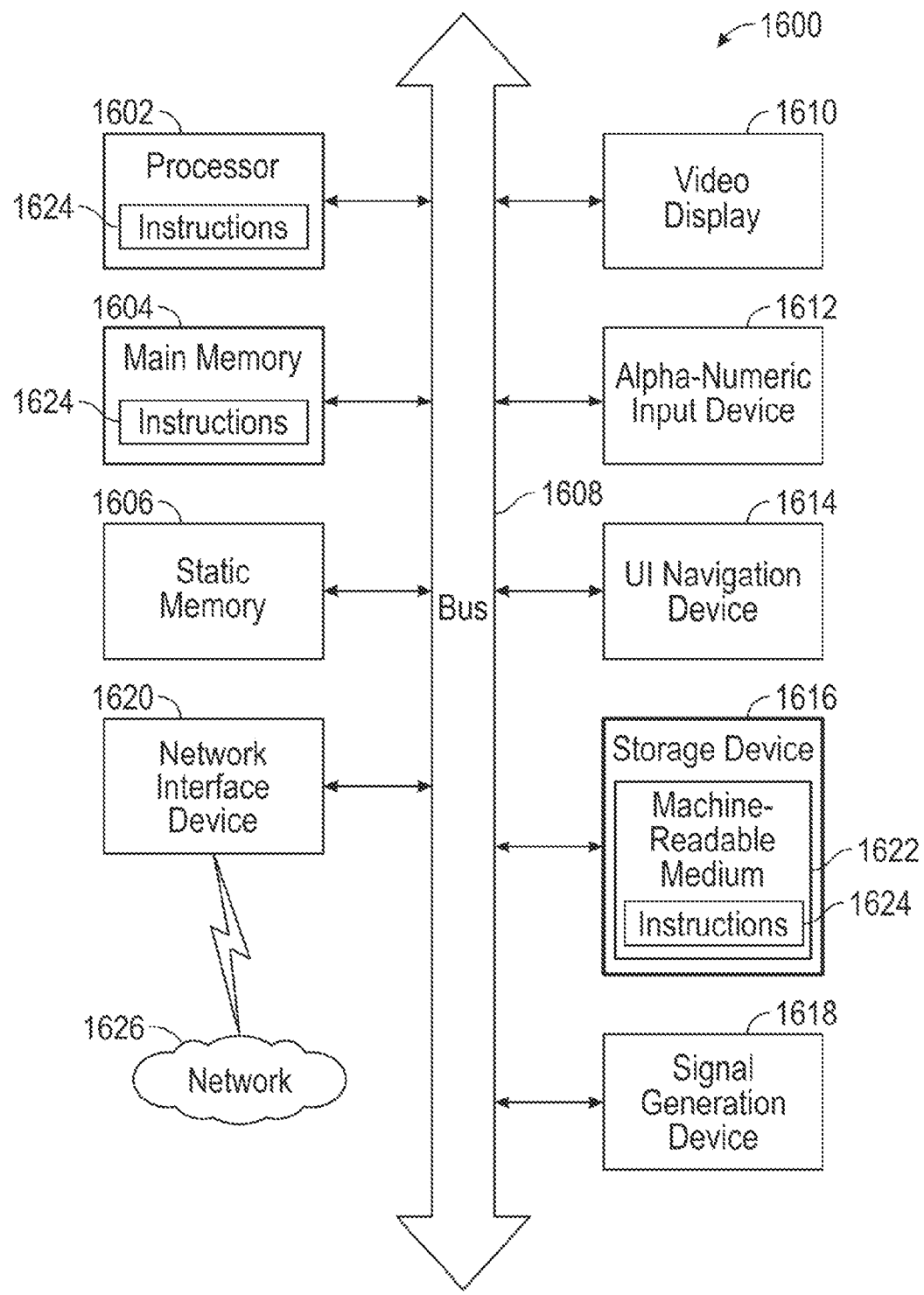
FIG. 16 is a block diagram illustrating a computing device hardware architecture.

FIG. 16 is a block diagram illustrating a computing device hardware architecture 1600, within which a set or sequence of instructions can be executed to cause a machine to perform examples of any one of the methodologies discussed herein. The hardware architecture 1600 describes a computing device for executing the vehicle autonomy system, described herein.

The architecture 1600 may operate as a standalone device or may be connected (e.g., networked) to other machines. In a networked deployment, the architecture 1600 may operate in the capacity of either a server or a client machine in server-client network environments, or it may act as a peer machine in peer-to-peer (or distributed) network environments. The architecture 1600 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 1600 includes a processor unit 1602 comprising at least one hardware processor (e.g., a central processing unit (CPU), a graphics processing unit (GPU), or both, processor cores, compute nodes). The architecture 1600 may further comprise a main memory 1604 and a static memory 1606, which communicate with each other via a link 1608 (e.g., bus). The architecture 1600 can further include a video display unit 1610, an input device 1612 (e.g., a keyboard), and a UI navigation device 1614 (e.g., a mouse). In some examples, the video display unit 1610, input device 1612, and UI navigation device 1614 are incorporated into a touchscreen display. The architecture 1600 may additionally include a storage device 1616 (e.g., a drive unit), a signal generation device 1618 (e.g., a speaker), a network interface device 1620, and one or more sensors (not shown), such as a Global Positioning System (GPS) sensor, compass, accelerometer, or other sensor.

In some examples, the processor unit 1602 or another suitable hardware component may support a hardware interrupt. In response to a hardware interrupt, the processor unit 1602 may pause its processing and execute an ISR, for example, as described herein.

The storage device 1616 includes, in some embodiments, a tangible, non-transitory computer readable medium 1622 on which is stored one or more sets of data structures and instructions 1624 (e.g., software) embodying or used by any one or more of the methodologies or functions described herein. The instructions 1624 can also reside, completely or at least partially, within the main memory 1604, within the static memory 1606, and/or within the processor unit 1602 during execution thereof by the architecture 1600, with the main memory 1604, the static memory 1606, and the processor unit 1602 also constituting machine-readable media.

Executable Instructions and Machine-Storage Medium

The various memories (i.e., 1604, 1606, and/or memory of the processor unit(s) 1602) and/or storage device 1616 may store one or more sets of instructions and data structures (e.g., instructions) 1624 embodying or used by any one or more of the methodologies or functions described herein. These instructions, when executed by processor unit(s) 1602 cause various operations to implement the disclosed examples.

As used herein, the terms "machine-storage medium," "device-storage medium," "computer-storage medium" (referred to collectively as "machine-storage medium 1622") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1622 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 1622 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer-readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 1624 can further be transmitted or received over a communications network 1626 using a transmission medium via the network interface device 1620 using any one of a number of well-known transfer protocols (e.g., HTTP). Examples of communication networks include a LAN, a WAN, the Internet, mobile telephone networks, plain old telephone service (POTS) networks, and wireless data networks (e.g., Wi-Fi, 3G, 4G LTE/LTE-A, 5G or WiMAX networks). The term "transmission medium" shall be taken to include any intangible medium that is capable of storing, encoding, or carrying instructions for execution by the machine, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of said features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

The invention claimed is:

1. A computing system comprising:
   one or more hardware processors; and
   one or more tangible, non-transitory, computer readable media that collectively store instructions that when executed by the one or more hardware processors cause the computing system to perform operations comprising:
   obtaining data indicative of an initial route of an aerial vehicle and data indicative of one or more parameters associated with the aerial vehicle;
   obtaining location data indicative of a location of a ground vehicle;
   determining a deviation route for the aerial vehicle from the initial route of the aerial vehicle to a geographic area including the ground vehicle based on:
   the data indicative of the initial route of the aerial vehicle, and
   the location data indicative of the location of the ground vehicle;
   determining to reroute the aerial vehicle, from the initial route, along the deviation route to collect image data associated with the geographic area based at least in part on the one or more parameters associated with the aerial vehicle; and
   communicating one or more commands to the aerial vehicle to divert the aerial vehicle to travel along the deviation route to the geographic area.

2. The computing system of claim 1, wherein the image data associated with the geographic area comprises one or more images of a portion of a ground route along which the ground vehicle is to travel within the geographic area.

3. The computing system of claim 1, wherein the operations further comprise:
   obtaining data indicating that a sensor of the ground vehicle is occluded from a portion of the geographic area; and
   wherein determining to reroute the aerial vehicle from the initial route along the deviation route to collect the image data associated with the geographic area comprises determining to reroute the aerial vehicle to collect the image data of the occluded portion of the geographic area.

4. The computing system of claim 1, wherein the ground vehicle is a ground-based autonomous vehicle.

5. The computing system of claim 1, wherein the operations further comprise obtaining the image data associated with the geographic area collected by the aerial vehicle.

6. The computing system of claim 5, wherein the operations further comprise communicating the image data to a tele-assistance computing system, wherein the tele-assistance computing system is configured to present the image data for display via a user interface.

7. The computing system of claim 6, wherein the operations further comprise communicating the image data to the ground vehicle, wherein the ground vehicle is configured to process the image data for autonomous operation of the ground vehicle.

8. The computing system of claim 1, wherein the ground vehicle is a light electric vehicle, and wherein the operations further comprise determining a location of the light electric vehicle within the geographic area based at least in part on the image data associated with the geographic area.

9. The computing system of claim 8, further comprising: determining whether the light electric vehicle is positioned in a permitted zone based at least in part on the location of the light electric vehicle.

10. The computing system of claim 8, wherein the light electric vehicle is a bicycle or a scooter.

11. The computing system of claim 10, wherein the operations further comprise:
communicating the image data to a mobile device, wherein the mobile device is configured to display the image data within a mobile application, the mobile application configured to display a user interface which allows a user to reserve the bicycle or scooter.

12. The computing system of claim 1, wherein the one or more parameters comprise at least one of a charge level of the aerial vehicle, a travel distance of the aerial vehicle, a current task of the aerial vehicle, a priority associated with the current task of the aerial vehicle, or a time constraint.

13. A method, comprising:
obtaining data indicative of an initial route of an aerial vehicle and data indicative of one or more parameters associated with the aerial vehicle;
obtaining location data indicative of a location of a ground vehicle;
determining a deviation route for the aerial vehicle from the initial route of the aerial vehicle to a geographic area including the ground vehicle based on:
the data indicative of the initial route of the aerial vehicle, and
the location data indicative of the location of the ground vehicle;
determining to reroute the aerial vehicle, from the initial route, along the deviation route to collect image data associated with the geographic area based at least in part on the one or more parameters associated with the aerial vehicle; and
communicating one or more commands to the aerial vehicle to divert the aerial vehicle to travel along the deviation route to the geographic area.

14. The method of claim 13, wherein the image data associated with the geographic area comprises one or more images of a portion of a ground route along which the ground vehicle is to travel within the geographic area.

15. The method of claim 14, the method further comprising obtaining data indicating that a sensor of the ground vehicle is occluded from a portion of the geographic area, wherein the determining to reroute the aerial vehicle from the initial route along the deviation route to collect the image data associated with the geographic area comprises determining to reroute the aerial vehicle to collect the image data of the occluded portion of the geographic area.

16. The method of claim 14, further comprising:
obtaining the image data associated with the geographic area collected by the aerial vehicle;
communicating the image data to a tele-assistance computing system, wherein the tele-assistance computing system is configured to present the image data for display via a user interface; and
communicating the image data to the ground vehicle, wherein the ground vehicle is configured to process the image data for autonomous operation of the ground vehicle.

17. The method of claim 13, wherein the ground vehicle is a light electric vehicle, and wherein the method further comprises determining a location of the light electric vehicle within the geographic area based at least in part on the image data associated with the geographic area.

18. The method of claim 17, further comprising determining whether the light electric vehicle is positioned in a permitted zone based at least in part on the location of the light electric vehicle.

19. The method of claim 18, further comprising communicating the image data to a mobile device, wherein the mobile device is configured to display the image data within a mobile application, the mobile application configured to provide a user interface that allows a user to reserve the light electric vehicle.

20. A non-transitory computer readable storage medium comprising instructions that when executed configure hardware processing circuitry to perform operations comprising:
obtaining data indicative of an initial route of an aerial vehicle and data indicative of one or more parameters associated with the aerial vehicle;
obtaining location data indicative of a location of a ground vehicle;
determining a deviation route for the aerial vehicle from the initial route of the aerial vehicle to a geographic area including the ground vehicle based on:
the data indicative of the initial route of the aerial vehicle, and
the location data indicative of the location of the ground vehicle;
determining to reroute the aerial vehicle, from the initial route, along the deviation route to collect image data associated with the geographic area based at least in part on the one or more parameters associated with the aerial vehicle; and
communicating one or more commands to the aerial vehicle to divert the aerial vehicle to travel along the deviation route to the geographic area.

* * * * *